United States Patent
Yabuuchi

(10) Patent No.: US 11,317,736 B2
(45) Date of Patent: May 3, 2022

(54) CHILD CARE EQUIPMENT WITH SEAT

(71) Applicant: APRICA CHILDREN'S PRODUCTS G.K., Osaka (JP)

(72) Inventor: Hitoshi Yabuuchi, Osaka (JP)

(73) Assignee: APRICA CHILDREN'S PRODUCTS G.K.

( * ) Notice: Subject to any disclaimer, the term of this patent is extended or adjusted under 35 U.S.C. 154(b) by 248 days.

(21) Appl. No.: 16/722,542

(22) Filed: Dec. 20, 2019

(65) Prior Publication Data

US 2020/0237116 A1   Jul. 30, 2020

(30) Foreign Application Priority Data

Jan. 28, 2019 (JP) .............................. JP2019-012478
Apr. 24, 2019 (JP) .............................. JP2019-083197

(51) Int. Cl.
*A47D 15/00* (2006.01)
*A44B 11/25* (2006.01)
*B62B 7/00* (2006.01)

(52) U.S. Cl.
CPC ........ *A47D 15/006* (2013.01); *A44B 11/2549* (2013.01); *B62B 7/006* (2013.01); *A44D 2203/00* (2013.01)

(58) Field of Classification Search
CPC ............ A44B 11/2549; A44D 2203/00; A47D 15/006; B62B 7/006; B62B 9/24; B60N 2/2812; Y10T 24/32
See application file for complete search history.

(56) References Cited

U.S. PATENT DOCUMENTS

| | | | |
|---|---|---|---|
| 10,357,083 B2* | 7/2019 | Babin | A44B 11/2561 |
| 11,124,152 B2* | 9/2021 | Babin | B60R 22/48 |
| 11,140,946 B2* | 10/2021 | Cheng | A44B 11/2592 |
| 2012/0080917 A1* | 4/2012 | Miller | B60N 2/2812 |
| | | | 297/250.1 |
| 2013/0015691 A1* | 1/2013 | Feng | B60N 2/2851 |
| | | | 297/256.15 |
| 2013/0038101 A1* | 2/2013 | Friedman | B60N 2/2812 |
| | | | 297/217.3 |
| 2014/0082894 A1* | 3/2014 | Walker | B60N 2/2803 |
| | | | 24/303 |

(Continued)

FOREIGN PATENT DOCUMENTS

| | | |
|---|---|---|
| JP | S62-128413 U | 8/1987 |
| JP | 2005-138742 A | 6/2005 |

*Primary Examiner* — Robert Sandy
*Assistant Examiner* — Louis A Mercado
(74) *Attorney, Agent, or Firm* — Eversheds Sutherlands (US) LLP

(57) ABSTRACT

Child care equipment with a seat can include a seat part forming an accommodating space for accommodating an infant. It can further include a crotch strap extending between thighs of the infant seated in the seat part and a pair of waist straps that restrains a waist of the infant. The child care equipment can also include a buckle connecting the crotch strap and the pair of waist straps. The buckle can include a pair of engaging members that are connected to the pair of waist straps. The buckle can also include an engaged member connected to the crotch strap. The engaging member can include a first magnet. The engaged member can include a second magnet that magnetically attracts the first magnet of the engaging member.

16 Claims, 27 Drawing Sheets

(56) References Cited

U.S. PATENT DOCUMENTS

| | | | |
|---|---|---|---|
| 2014/0317890 A1* | 10/2014 | Koons | A44B 11/00 24/303 |
| 2016/0029812 A1* | 2/2016 | Terhune | A47D 1/006 297/153 |
| 2017/0341540 A1* | 11/2017 | Spano | B62B 3/1452 |
| 2021/0204658 A1* | 7/2021 | Jessup | A44B 11/2549 |

* cited by examiner

CHILD CARE EQUIPMENT WITH SEAT

CROSS-REFERENCE TO RELATED APPLICATIONS

This application claims priority to Japanese Patent Application No. 2019-012478, filed on Jan. 28, 2019 and Japanese Patent Application No. 2019-083197, filed on Apr. 24, 2019, the entire contents of each of which are hereby incorporated herein by reference in their entirety for all purposes.

FIELD OF THE TECHNOLOGY

The present disclosure relates to child care equipment with a seat, and more particularly to child care equipment with a seat which includes a buckle.

BACKGROUND

Conventionally, child care equipment with a seat such as a stroller, a child safety seat, and a child care chair is provided with a body restraining harness that restrains an infant's body when the infant is seated in a seat.

For example, Japanese Unexamined Patent Publication No. 2005-138742 ("Patent Document 1") is known as such a body restraining harness for a stroller. Patent Document 1 discloses a crotch strap that can be separated with shoulder straps and waist straps kept connected for smooth diaper change.

For example, Japanese Unexamined Utility Model Publication No. 62-128413 ("Patent Document 2") is known as a method for performing lock and unlock operations using magnetic attraction and repulsion. Patent Document 2 discloses that a buckle body and a timepiece that is attached to the buckle body such that the timepiece can be opened and closed, and both the buckle body and the timepiece have a magnet. The timepiece is closed due to attraction of the magnets. When a tab of the buckle body is moved against elasticity of a spring member, the magnets repel each other, and the timepiece is opened.

SUMMARY

In the body restraining harness disclosed in Patent Document 1, only the crotch strap can be separated, but lock and unlock operations cannot be easily performed. In Patent Document 2, lock and unlock operations can be performed using magnetic attraction and repulsion. However, this configuration is not applicable to articles that are subjected to a large load.

The child care equipment with a seat according to one embodiment of the disclosure can include: a seat part forming an accommodating space for accommodating an infant; a crotch strap extending between thighs of the infant seated in the seat part; a pair of waist straps that restrains a waist of the infant; and a buckle connecting the crotch strap and the pair of waist straps. The buckle includes a pair of engaging members connected to the pair of waist straps, and an engaged member connected to the crotch strap. The engaging member has a first magnet, and the engaged member has a second magnet that magnetically attracts the first magnet.

Preferably, the engaging member includes an insertion portion having the first magnet, the engaged member includes a fixed portion connected to the crotch strap and an operation portion supported by the fixed portion such that the operation portion can be displaced with respect to the fixed portion, the fixed portion has a pair of through holes into which the insertion portions of the pair of engaging members can be inserted, and the operation portion has the second magnet that can be displaced between a position facing the pair of through holes and a position not facing the pair of through holes by operation of the operation portion in an operation direction.

Preferably, the operation portion further has a third magnet that is opposite in polarity from the second magnet, and the third magnet of the engaged member can be displaced to a position facing the first magnets of the engaging members inserted into the pair of through holes.

Preferably, the operation portion includes a first operation portion facing one of the pair of through holes, and a second operation portion facing the other through hole.

Preferably, the second magnet and the third magnet are aligned in the operation direction of the operation portion, and the third magnet is located on an outer side in the operation direction of the second magnet.

Preferably, the second magnet and the third magnet are aligned in the operation direction of the operation portion, and the third magnet is located on an inner side of the second magnet.

Preferably, the operation portion is disposed at a position facing the pair of through holes.

Preferably, the engaged member further includes a lock portion that engages in an elastically deformable manner with the insertion portions of inserted into the through holes to keep the insertion portions engaged.

Preferably, the lock portion releases the insertion portions by operation of the operation portion.

Preferably, the engaging member and/or the engaged member includes a movement restricting portion that restricts the insertion portion from moving outward in the operation direction within the through hole while the insertion portion is located in the through hole.

Preferably, the engaging member includes an insertion portion having the first magnet, the engaged member includes a fixed portion connected to the crotch strap and an operation portion supported by the fixed portion such that the operation portion can be displaced with respect to the fixed portion, the fixed portion has a pair of through holes into which the insertion portions of the pair of engaging members can be inserted, and the operation portion has an operation button and an operating portion that is displaced by operation of the operation button. The operating portion has the second magnet that can be displaced between a position facing the pair of through holes and a position not facing the pair of through holes.

Preferably, the operating portion further has a third magnet that is opposite in polarity from the second magnet, and by operation of the operation button, the third magnet of the engaged member can be displaced to a position facing the first magnets of the engaging members inserted into the pair of insertion portions.

Preferably, the operating portion has a first operating portion facing one of the pair of through holes, and a second operating portion facing the other through hole, the number of operation buttons is one, and the first operating portion and the second operating portion can be displaced by operation of the operation button.

Preferably, the first operating portion and the second operating portion are rotatably held in the fixed portion.

BRIEF DESCRIPTION OF THE DRAWINGS

FIG. 4A illustrates engaging members engaged with the engaged member, and FIG. 4B illustrates the engaging members not engaged with the engaged member.

FIG. 5A is a front view and FIG. 5B is a rear view.

FIG. 6A shows a first lock portion and a second lock portion of the lock portion engaged with each other, FIG. 6B shows the first lock portion, and FIG. 6C shows the second lock portion.

FIG. 7A shows the operation portions and the lock portion with the operation portions not being operated, and FIG. 7B shows the operation portions and the lock portion with the operation portions being operated.

FIG. 8A shows the state before the engaging member is engaged with the engaged member, FIG. 8B shows the engaging member engaged with the engaged member, and FIG. 8C shows the engaging member disengaged from the engaged member.

FIG. 11A shows engaging members engaged with an engaged member and FIG. 11B shows the engaging members not engaged with the engaged member.

FIG. 12A is a partially transparent front view, FIG. 12B is a longitudinal section taken along line XII(b)-XII(b) in FIG. 12A, and FIG. 12C is a transverse section taken along line XII(c)-XII(c) in FIG. 12A.

FIG. 13A is a partially transparent front view, FIG. 13B is a longitudinal section taken along line XIII(b)-XIII(b) in FIG. 13A, and FIG. 13C is a transverse section taken along line XIII(c)-XIII(c) in FIG. 13A.

FIG. 15A illustrates engaging members engaged with the engaged member, and FIG. 15B illustrates the engaging members not engaged with the engaged member.

FIG. 16A shows the state before the engaging members are engaged with the engaged member, FIG. 16B shows the engaging members engaged with the engaged member, and FIG. 16C shows the engaging members disengaged from the engaged member.

FIG. 17A shows the state before the engaging members are engaged with the engaged member, FIG. 17B shows the engaging members engaged with the engaged member, and FIG. 17C shows the engaging members disengaged from the engaged member.

FIG. 18A is a plan view, FIGS. 18B to 18D are sectional views taken along line XIX-XIX in FIG. 18A, FIG. 18C shows the engaging members engaged with the engaged member, FIG. 18D shows the engaging members and the engaged member with operation portions of the engaged member being operated, and FIG. 18D shows the engaging members disengaged from the engaged member.

FIG. 20A is a perspective view and FIG. 20B is a sectional view taken along line XX-XX in FIG. 20A.

FIG. 21A is a perspective view and FIG. 21B is a sectional view taken along line XXI-XXI in FIG. 21A.

FIG. 22A is a perspective view, FIG. 22B is a sectional view taken along line XXII-XXII in FIG. 22A, and FIG. 22C illustrates the dimensions of the movement restricting portion.

FIG. 25A shows engaging members engaged with the engaged member, and FIG. 25B shows the engaging members not engaged with the engaged member.

FIG. 26A shows the operation portion and the lock portion with the operation portion not being operated.

FIGS. 27A and 27B are sectional perspective views illustrating how the operation portion operates, where FIG. 27A shows the buckle with the operation portion not being operated, and FIG. 27B shows the buckle with the operation portion being operated.

DESCRIPTION OF EXAMPLE EMBODIMENTS

Figure 1:
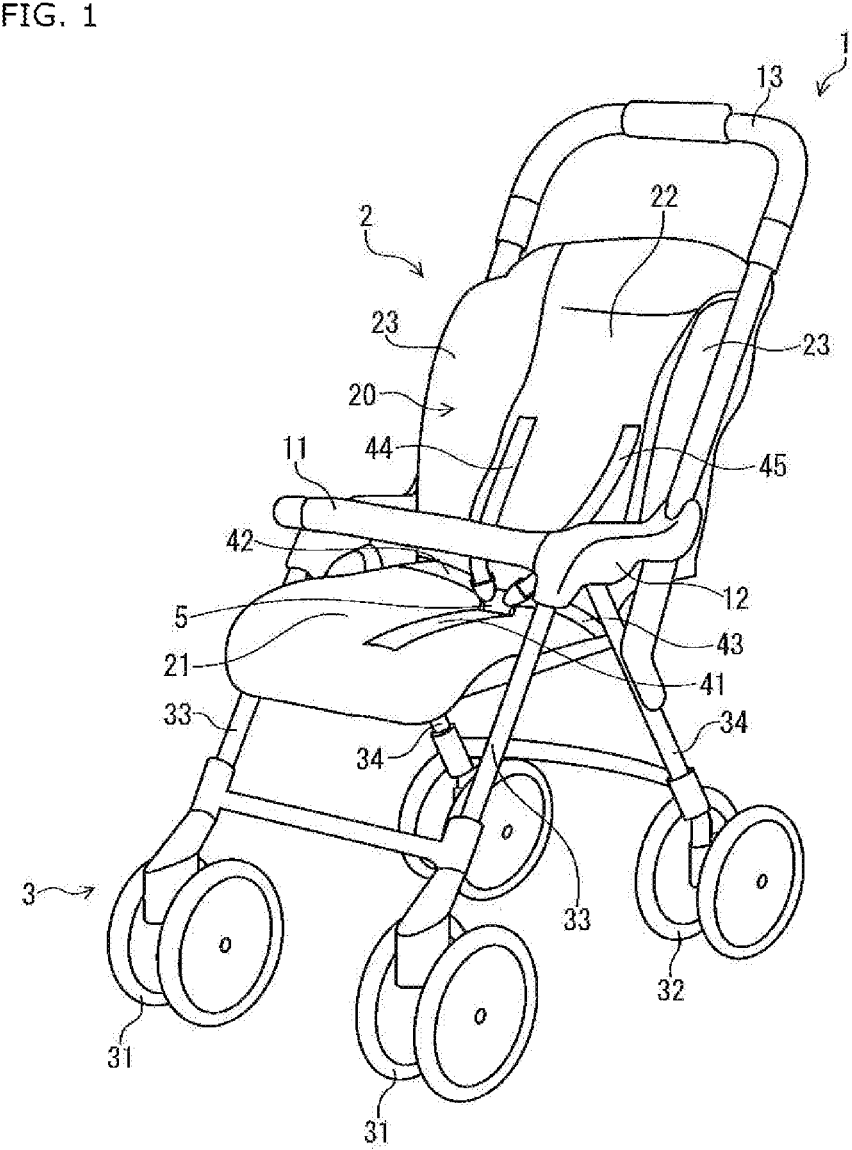
FIG. 1 is a perspective view illustrating an example of child care equipment with a seat according to a first embodiment.

Embodiments of the present disclosure will be described in detail with reference to the accompanying drawings. In the drawings, the same or corresponding parts are denoted with the same reference characters and description thereof will not be repeated.

Overview of Stroller

An overview of a stroller 1 as child care equipment with a seat according to an embodiment will be given with reference to FIG. 1. In the description of the stroller 1, the front-rear direction corresponds to the front-rear direction of the stroller 1, and the left-right direction corresponds to the left-right direction as viewed from the front of the stroller 1.

The basic structure of the stroller 1 may be similar to that of a common stroller. The stroller 1 includes a body 2, a leg part 3 that supports the body 2 from below, a front guard 11, and a push bar 13. The leg part 3 has a pair of front legs 33 having front wheels 31 and a pair of rear legs 34 having rear wheels 32. The body 2 has a seat part 20 forming an accommodating space for accommodating an infant. The seat part 20 includes, e.g., a seat 21, a backrest 22, and a pair of standing portions 23 standing from both edges of the backrest 22. The front guard 11 is disposed in front of the seat part 20 and extends in the left-right direction. The front guard 11 is connected to a pair of handrails 12 disposed on the right and left sides of the seat part 20.

The seat part 20 of the stroller 1 is provided with a restraining harness that restrains the infant's body. The restraining harness includes a crotch strap 41, a waist strap 42, a waist strap 43, a shoulder strap 44, a shoulder strap 45, and a buckle 5. The crotch strap 41 extends between thighs of the infant seated in the seat part 20. The waist straps 42, 43 restrain the infant's waist, and the shoulder straps 44, 45 restrain the infant's shoulders. The buckle 5 connects these straps 41, 42, 43, 44, 45.

The buckle 5 used in the stroller 1 will be described in detail below.

First Embodiment

A configuration example of the buckle 5 will be described in detail with reference also to FIGS. 2A to 8C. In the following description, the left-right direction and the up-down direction are based on the left-right direction and the up-down direction on the paper of FIG. 2A, respectively. In the following description, the left-right direction is sometimes referred to as the lateral direction.

Figure 2A:
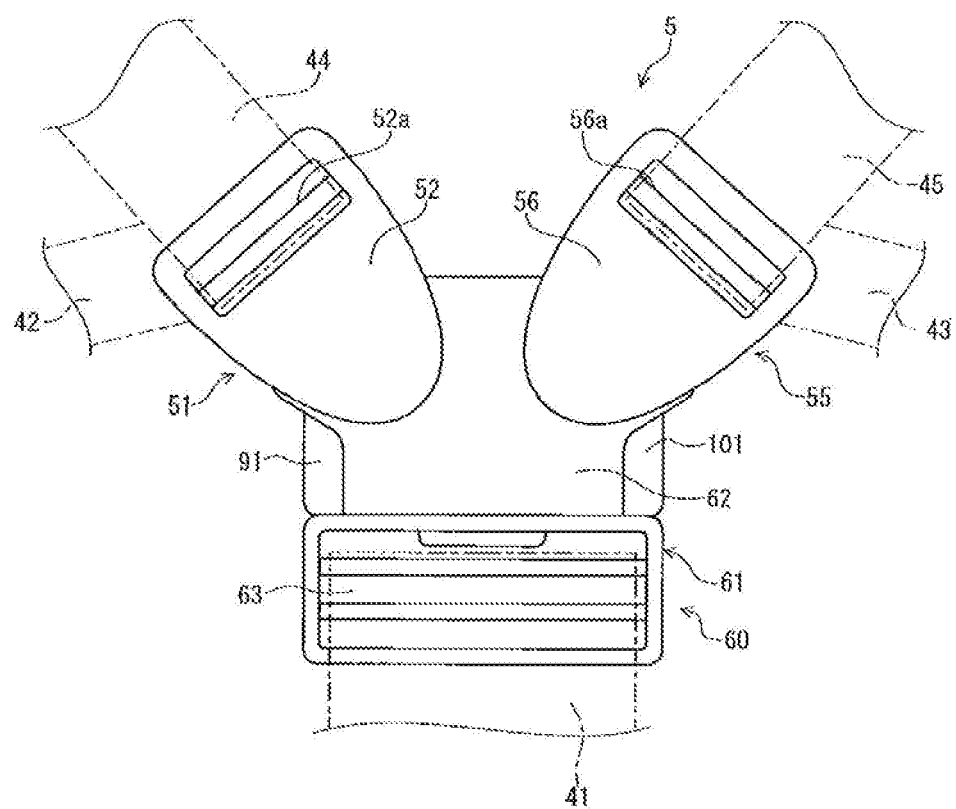
FIG. 2A is a front view of a buckle of the first embodiment.
Figure 2B:
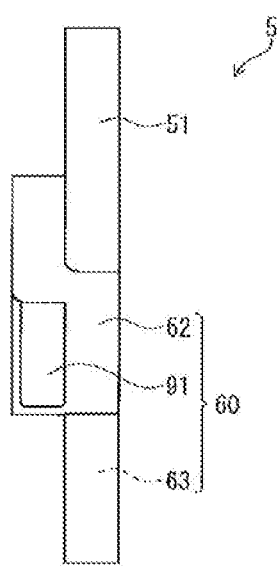
FIG. 2B is a left side view thereof.

Referring particularly to FIGS. 2A and 2B, the buckle 5 in the present embodiment includes a left engaging member 51, a right engaging member 55, and an engaged member 60. The left engaging member 51 is connected to the waist strap 42 and the shoulder strap 44. The right engaging member 51 is connected to the waist strap 43 and the shoulder strap 45. The engaged member 60 is connected to the crotch strap 41. The engaged member 60 can be detachably connected to the left engaging member 51 and the right engaging member 55.

Left Engaging Member

The left engaging member 51 will be described with reference to FIGS. 2A to 4B and FIGS. 8A to 8C. The left engaging member 51 includes a body 52, an insertion portion 53, and a first magnet 54.

The body 52 has a triangular shape as viewed in plan. The front surface of the body 52 is flat, but the back surface thereof has a stepped portion 52b. The body 52 has in its upper part an attachment hole 52a through which the waist strap 42 and the shoulder strap 44 pass. The attachment hole 52a is a through hole extending from the front surface to the back surface of the body 52. The stepped portion 52b has the insertion portion 53 projecting outward. The insertion portion 53 is a portion that is inserted through a through hole 64a of the engaged member 60 described later.

Figure 8A:
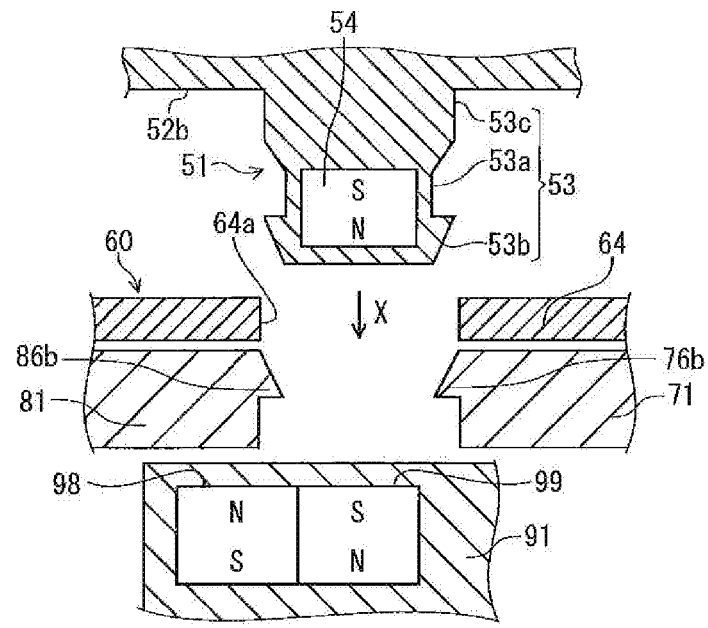
FIGS. 8A to 8C are schematic views illustrating how the engaging member and the engaged member of the first embodiment operate, where
Figure 8B:
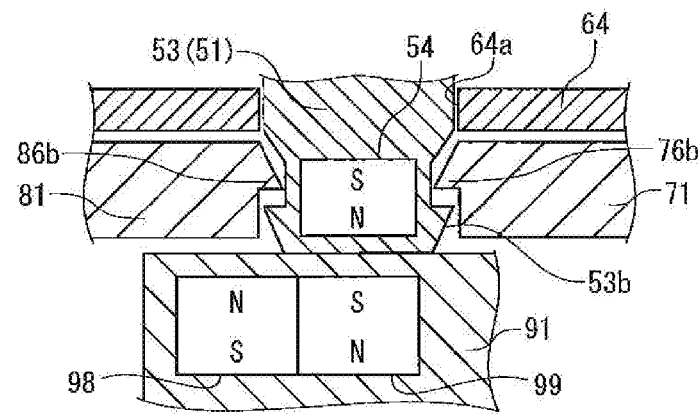
Figure 8C:
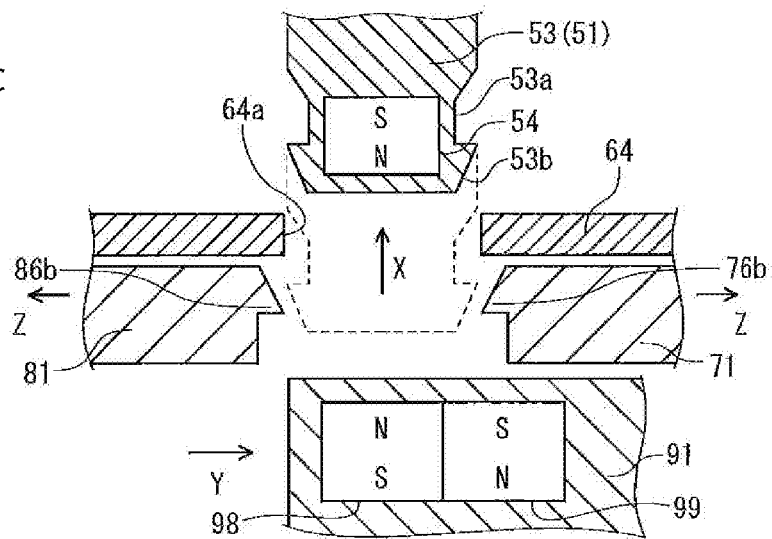

As shown in FIGS. 8A to 8C, the insertion portion 53 has a cylindrical shape and includes a first projecting portion 53c, a slit portion 53a, and a second projecting portion 53b. The first projecting portion 53c projects from the stepped portion 52b. The slit portion 53a is continuous with the first projecting portion 53c and is recessed inward with respect to the first projecting portion 53c. The second projecting portion 53b is continuous with the slit portion 53a. The outer peripheral surface of the boundary portion between the first projecting portion 53c and the slit portion 53a is tilted, and the second projecting portion 53b has a tapered shape. The first magnet 54 is placed in the insertion portion 53. The first magnet 54 may be exposed from the insertion portion 53 or may be embedded in the insertion portion 53. The first magnet 54 has been magnetized in the direction from the front surface toward the back surface of the body 52 (engagement direction). Specifically, the back side of the first magnet 54 is an N pole and the front side of the first magnet 54 is an S pole.

Right Engaging Member

The right engaging member 55 will be described with reference to FIGS. 2A to 4B. The right engaging member 55 has a configuration similar to that of the left engaging member 51. The right engaging member 55 includes a body 56, an insertion portion 57, and a first magnet 58.

The body 56 has a triangular shape as viewed in plan. The front surface of the body 56 is flat, but the back surface thereof has a stepped portion 56b. The body 56 has in its upper part an attachment hole 56a through which the waist strap 43 and the shoulder strap 45 pass. The attachment hole 56a is a through hole extending from the front surface to the back surface of the body 56. The stepped portion 56b has the insertion portion 57 projecting outward. The insertion portion 57 is a portion that is inserted through a through hole 65a of the engaged member 60 described later.

Although the specific shape of the insertion portion 57 is not shown, the insertion portion 57 has a configuration similar to that of the insertion portion 53 of the left engaging member 51 as shown in FIGS. 8A to 8C. That is, the insertion portion 57 has a cylindrical shape and includes a first projecting portion, a slit portion, and a second projecting portion. The first magnet 58 is placed in the insertion portion. The first magnet 58 may be exposed from the insertion portion 57 or may be embedded in the insertion portion 57. The first magnet 58 has been magnetized in the direction from the front surface toward the back surface of the body 56 (engagement direction). Specifically, the back side of the first magnet 58 is an N pole and the front side of the first magnet 58 is an S pole.

Engaged Member

Figure 3:
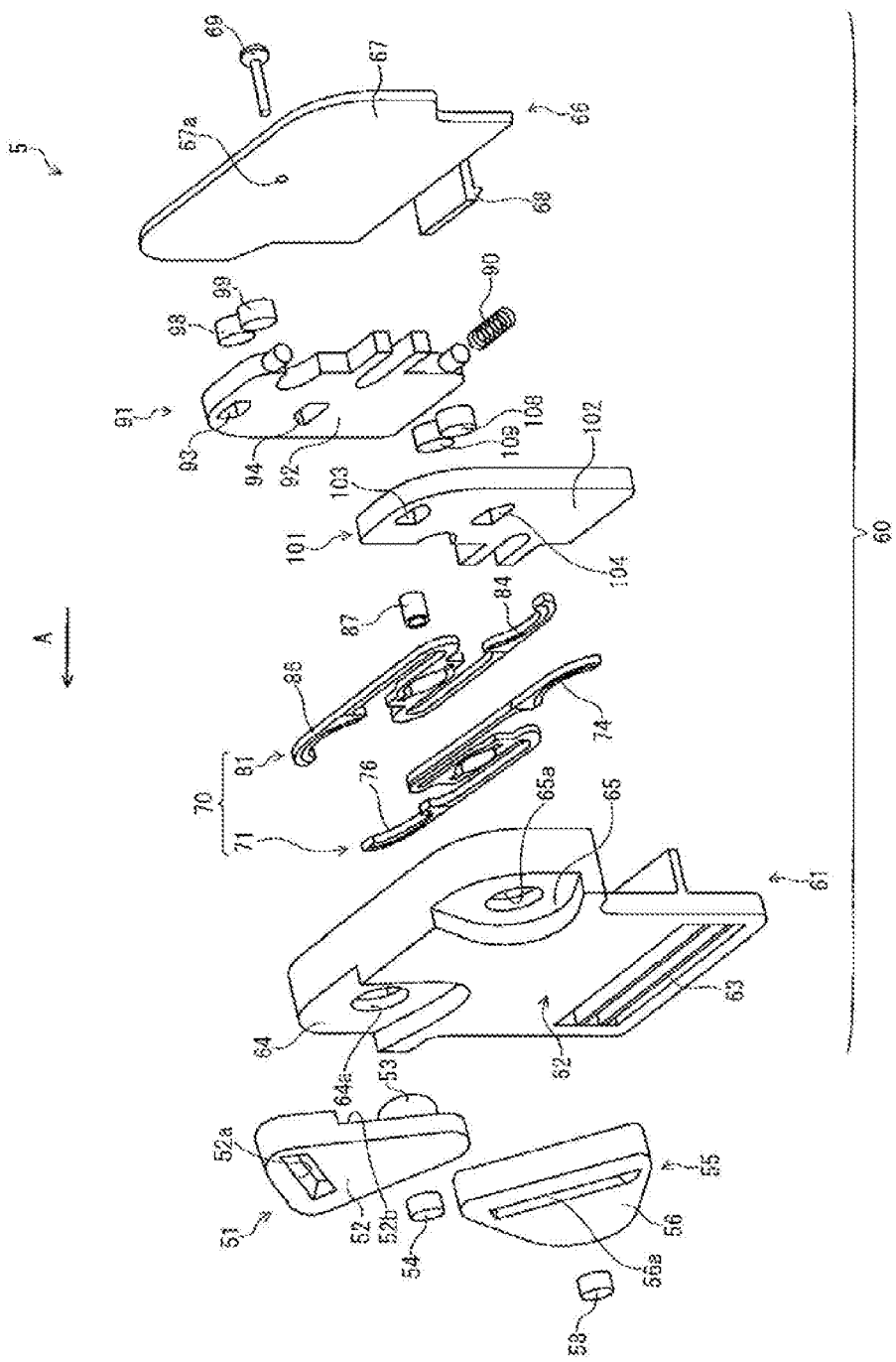
FIG. 3 is an exploded perspective view of the buckle of the first embodiment.

The engaged member 60 will be described with reference to FIGS. 2A to 6C. As shown in FIG. 3, the engaged member 60 includes a fixed portion 61, a left operation portion 91, a right operation portion 101, and a lock portion 70. The configuration of each portion will be described in detail. The direction of arrow A in FIG. 3 is the front side (front surface), and the opposite direction to the direction of arrow A is the back side (back surface).

As shown especially in FIG. 3, the fixed portion 61 serves as a case that accommodates the pair of operation portions 91, 101 and the lock portion 70 therein. The fixed portion 61 includes a housing 62, an attachment hole 63, a left recess 64, and a right recess 65. The attachment hole 63 is formed in the lower part of the housing 62, and the left recess 64 and the right recess 65 are formed in the upper part of the housing 62. As shown in FIGS. 2A and 2B, the attachment hole 63 is a through hole which extends from the front surface to the back surface of the housing 62 and through which the crotch strap 41 passes.

The left recess 64 is formed in the upper left end of the housing 62. The left recess 64 is recessed from the front surface of the housing 62 and has the through hole 64a substantially in the center. The through hole 64a has a circular shape and is slightly larger than the insertion portion 53 of the left engaging member 51 so that the insertion portion 53 can be inserted therethrough. The depth dimension of the left recess 64 is the same as the thickness dimension of the stepped portion 52b of the left engaging member 51. Accordingly, as shown in FIG. 2B, the front surface of the left engaging member 51 and the front surface of the housing 62 are flush with each other when the insertion portion 53 is inserted through the through hole 64a.

The right recess 65 has substantially the same shape as the left recess 64. That is, the right recess 65 is formed in the upper right end of the housing 62. The right recess 65 is recessed from the front surface of the housing 62 and has the through hole 65a substantially in the center. The through hole 65a has a circular shape and is slightly larger than the insertion portion 57 of the right engaging member 55 so that the insertion portion 57 can be inserted therethrough. The depth dimension of the right recess 65 is the same as the thickness dimension of the stepped portion 56b of the right engaging member 55. Accordingly, like the left recess 64, the front surface of the right engaging member 55 and the front surface of the housing 62 are flush with each other when the insertion portion 57 is inserted through the through hole 65a.

As shown in FIG. 3, a cover 66 is attached to the back surface of the fixed portion 61. The pair of operation portions 91, 101 and the lock portion 70 are thus accommodated in the housing 62 of the fixed portion 61 and covered by the cover 66. The cover 66 includes a cover body 67 and a latch portion 68 provided under the cover body 67. The cover body 67 covers the entire back surface of the housing 62. The latch portion 68 latches and holds a latched portion (not shown) provided below the housing 62. The cover body 67 has a hole 67a substantially in the center. The fixed portion 61 and the cover 66 are fixed together by tightening a screw 69 into the hole 67a.

Figure 4A:
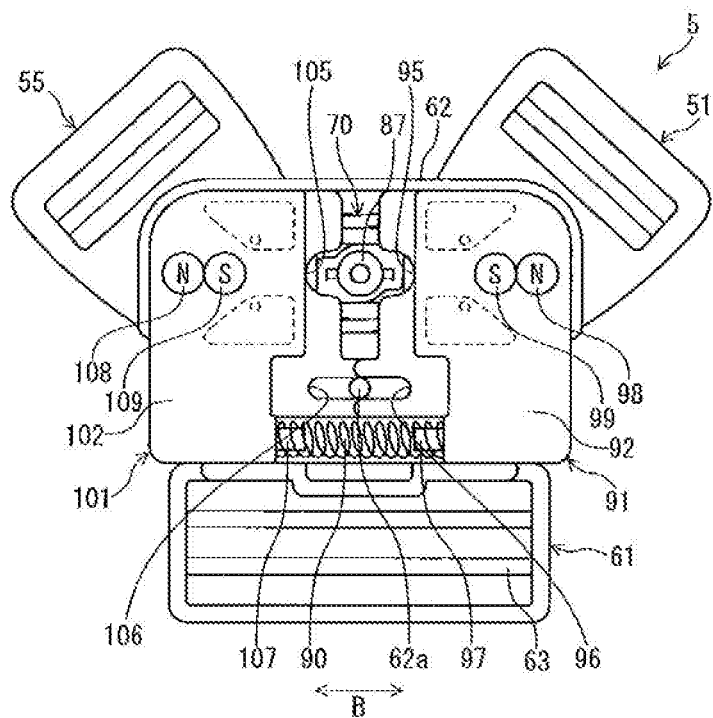
FIGS. 4A and 4B are rear views of an engaged member with a cover removed, illustrating how operation portions operate, where
Figure 4B:
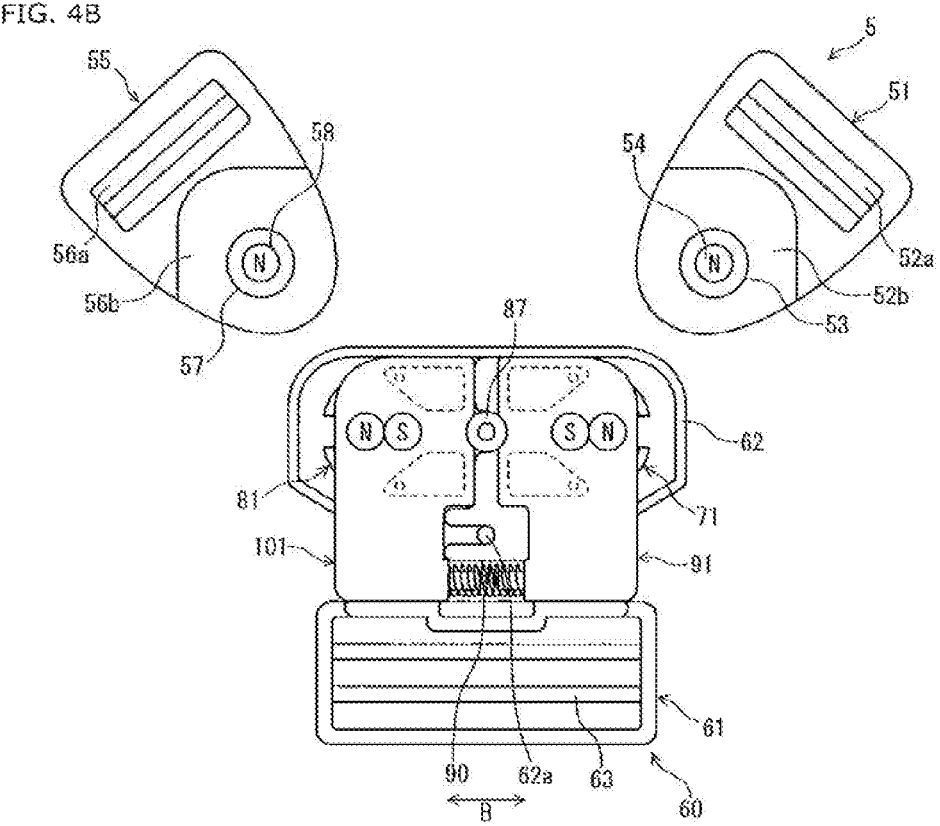
Figure 5A:
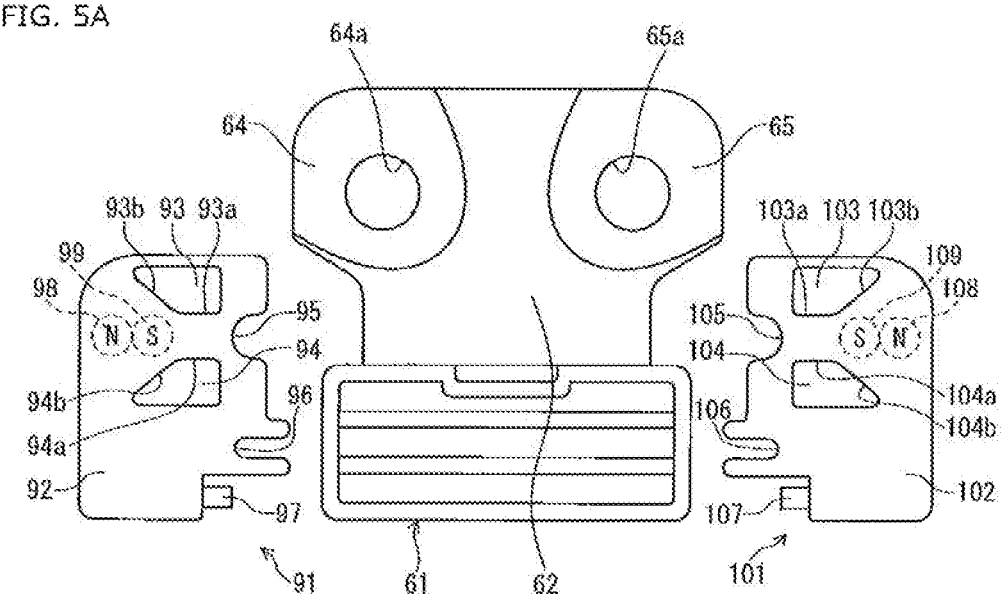
FIGS. 5A and 5B show the operation portions of the engaged member being removed from a fixed portion, where
Figure 5B:
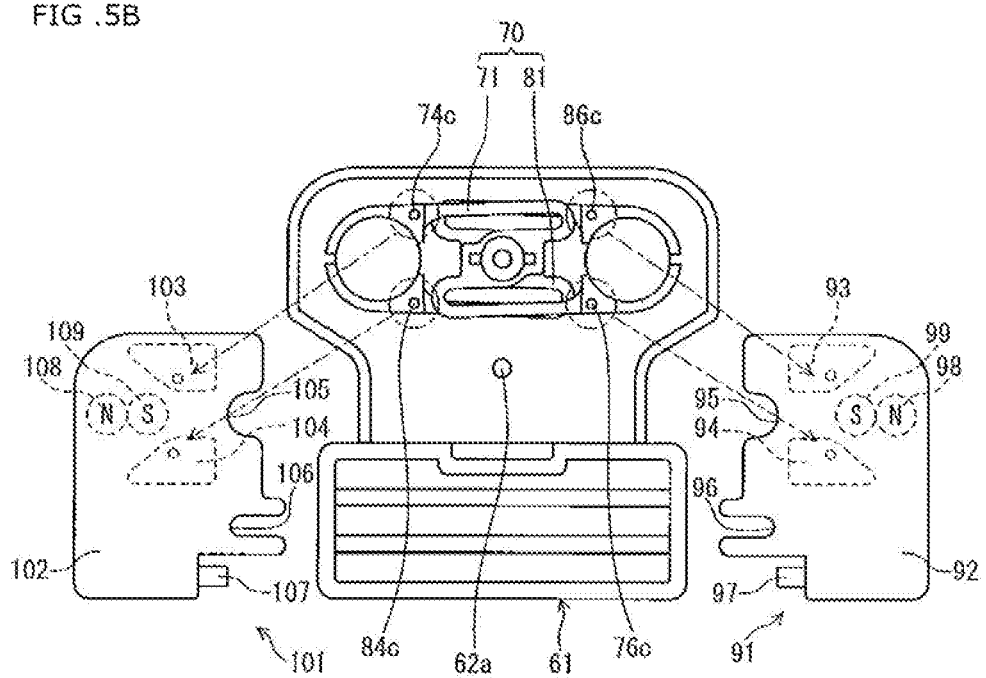

The left operation portion 91 and the right operation portion 101 will be described with reference to FIGS. 3 to 5B. The left operation portion 91 and the right operation portion 101 can be moved in the operation direction, that is, the left-right direction shown by arrow B. The left operation portion 91 faces the through hole 64a of the fixed portion 61, and the right operation portion 101 faces the through hole 65a of the fixed portion 61. FIGS. 5A and 5B illustrate the operation portions 91, 101 of the engaged member 60 being removed from the fixed portion 61. FIG. 5A is a front view and FIG. 5B is a rear view. FIG. 5A shows the front surfaces of the fixed portion 61 and the operation portions 91, 101, and FIG. 5B shows the back surfaces of the fixed portion 61 and the operation portions 91, 101.

The left operation portion 91 includes an operation body 92, an upper recess 93, a lower recess 94, a second magnet 99, and a third magnet 98. The upper and lower recesses 93, 94 are formed in the front surface of the operation body 92. As shown especially in FIGS. 5A and 5B, the operation body 92 has a first cutout 95, a second cutout 96, and a spring support 97 on its inner side (the side facing the right operation portion 101). As shown in FIGS. 4A and 4B, the first cutout 95 contacts a fixing screw 87, described later, when the left operation portion 91 is operated. The second cutout 96 contacts a stopper 62a located on the back surface of the housing 62 when the left operation portion 91 is operated. The spring support 97 supports a spring 90. The left operation portion 91 is always biased outward by the spring 90.

As shown in FIG. 5A, the upper recess 93 and the lower recess 94 have a substantially trapezoidal shape as viewed in plan and are formed so that they are located horizontally symmetrically. The lower side of the upper recess 93 has a flat portion 93a and a tilted portion 93b. The flat portion 93a extends horizontally, and the tilted portion 93b is tilted obliquely upward from the flat portion 93a. The upper side of the lower recess 94 has a flat portion 94a and a tilted portion 94b. The flat portion 94a extends horizontally, and the tilted portion 94b is tilted obliquely upward from the flat portion 94a. As shown in FIG. 5B, a projection 86c of a second lock portion 81 described later is located in the upper recess 93, and a projection 76c of a first lock portion 71 described later is located in the lower recess 94. Accordingly, the projection 86c moves within the upper recess 93 and the projection 76c moves within the lower recess 94 when the left operation portion 91 is operated. This operation will be described later.

Although the pair of operation portions 91, 101 are shown detached from the fixed portion 61, the projection 86c is actually located in the upper recess 93, the projection 76c is located in the lower recess 94, a projection 74c is located in an upper recess 103, and a projection 84c is located in a lower recess 104. This is shown by long dashed short dashed lines in FIG. 5B.

The second magnet 99 and the third magnet 98 are aligned in the operation direction of the operation portions 91, 101. Specifically, the second magnet 99 and the third magnet 98 are aligned in the left-right direction. The second magnet 99 is mounted on the inner side in the operation direction (the side facing the right operation portion 101), and the third magnet 98 is mounted on the outer side in the operation direction (the side not facing the right operation portion 101). As shown in FIGS. 8A to 8C, the second magnet 99 and the third magnet 98 can be displaced between a position facing the through hole 64a of the fixed portion 61 and a position not facing the through hole 64a of the fixed portion 61. The second magnet 99 has been magnetized in the direction from the front surface toward the back surface of the left operation portion 91 (engagement direction). Specifically, the front side of the second magnet 99 is an S pole and the back side of the second magnet 99 is an N pole. Like the second magnet 99, the third magnet 98 has been magnetized in the direction from the front surface toward the back surface of the left operation portion 91 (engagement direction). The third magnet 98 is opposite in polarity from the second magnet 99. Namely, the front side of the third magnet 98 is an N pole and the back side of the third magnet 98 is an S pole.

The right operation portion 101 has substantially the same shape as the left operation portion 91. That is, the right operation portion 91 includes an operation body 102, the upper recess 103, a lower recess 104, a second magnet 109, and a third magnet 108. The upper and lower recesses 103, 104 are formed in the front surface of the operation body 102. As shown especially in FIGS. 5A and 5B, the operation body 102 has a first cutout 105, a second cutout 106, and a spring support 107 on its inner side (the side facing the left operation portion 91). The first cutout 105 contacts the fixing screw 87, described later, when the right operation portion 101 is operated. The second cutout 106 contacts the stopper 62a located on the back surface of the housing 62 when the right operation portion 101 is operated. The spring support 107 supports the spring 90. The right operation portion 101 is always biased outward by the spring 90. That is, since the spring 90 is provided, the pair of operation portions 91, 101 is always biased outward. The operation portions 91, 191 are brought into the state shown in FIG. 4B when pressed inward, but return to the state shown in FIG. 4A when the hand is released from the operation portions 91, 191.

The upper recess 103 and the lower recess 104 have a substantially trapezoidal shape as viewed in plan and are formed so that they are located horizontally symmetrically. The lower side of the upper recess 103 has a flat portion 103a and a tilted portion 103b. The flat portion 103a extends horizontally, and the tilted portion 103b is tilted obliquely upward from the flat portion 103a. The upper side of the lower recess 104 has a flat portion 104a and a tilted portion 104b. The flat portion 104a extends horizontally, and the tilted portion 104b is tilted obliquely upward from the flat portion 104a. As shown in FIG. 5B, the projection 74c of the first lock portion 71 described later is located in the upper recess 103, and the projection 84c of the second lock portion 81 described later is located in the lower recess 104. Accordingly, the projection 74c moves within the upper recess 103 and the projection 84c moves within the lower recess 104 when the right operation portion 101 is operated. This operation will be described later.

The second magnet 109 and the third magnet 108 are aligned in the left-right direction. The second magnet 109 is mounted on the inner side in the operation direction (the side facing the left operation portion 91), and the third magnet 108 is mounted on the outer side in the operation direction (the side not facing the left operation portion 91). Although the specific configurations of the second magnet 109 and the third magnet 108 are not shown, the second magnet 109 and the third magnet 108 have configurations similar to those of the second magnet 99 and the third magnet 98 as shown in FIGS. 8A to 8C. That is, the second magnet 109 and the third magnet 108 can be displaced between a position facing the through hole 65a of the fixed portion 61 and a position not facing the through hole 65a of the fixed portion 61. The second magnet 109 has been magnetized in the direction from the front surface toward the back surface of the right operation portion 101 (engagement direction). Specifically, the front side of the second magnet 109 is an S pole and the back side of the second magnet 109 is an N pole. Like the second magnet 109, the third magnet 108 has been magnetized in the direction from the front surface toward the back surface of the right operation portion 101 (engagement direction). The third magnet 108 is opposite in polarity from the second magnet 109. Namely, the front side of the third magnet 108 is an N pole and the back side of the third magnet 108 is an S pole.

Next, the lock portion 70 will be described. As shown in FIGS. 5B and 7A to 8C, the lock portion 70 is a member that engages in an elastically deformable manner with the insertion portions 53, 57 of the pair of engaging members 51, 55 inserted through the through holes 64a, 65a of the fixed portion 61 to keep the insertion portions 53, 57 engaged. The lock portion 70 releases the insertion portions 53, 57 when the operation portions 91, 101 are operated.

Figure 6A:
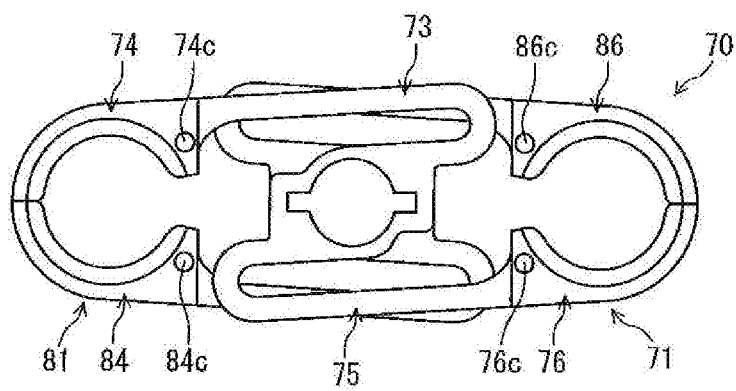
FIGS. 6A to 6C show a lock portion of the engaged member, where
Figure 6B:
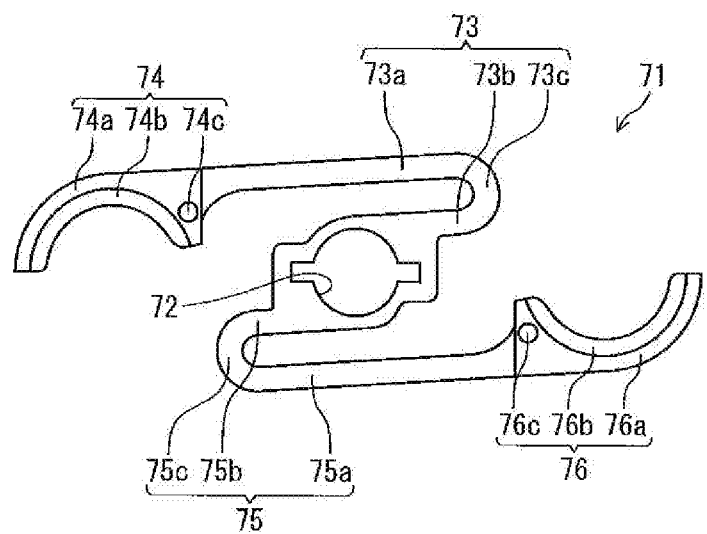
Figure 6C:
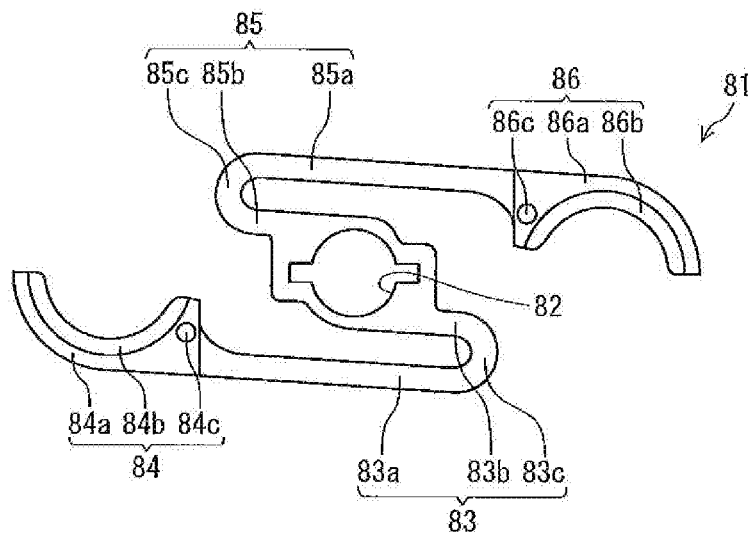

As shown in FIG. 6A, the lock portion 70 includes the first lock portion 71 and the second lock portion 81. As shown in FIGS. 6B and 6C, the first lock portion 71 and the second lock portion 81 are preferably composed of two members. The first lock portion 71 and the second lock portion 81 are disposed in a point symmetrical manner with respect to shaft portions 72, 82. FIGS. 6A to 6C show the lock portion 70 as viewed from the back.

As shown in FIG. 6B, the first lock portion 71 has a substantially Z shape as viewed in plan and includes the shaft portion 72, a first moving portion 74, a first connecting portion 73, a second moving portion 76, and a second connecting portion 75. The first moving portion 74 is located above the shaft portion 72. The first connecting portion 73 connects the shaft portion 72 and the first moving portion 74. The second moving portion 76 is located below the shaft portion 72. The second connecting portion 75 connects the shaft portion 72 and the second moving portion 76.

The shaft portion 72 is a through hole located substantially in the center of the first lock portion 71 and extending from the front surface to the back surface of the first lock portion 71. The shaft portion 72 is a portion that is fixed to the housing 62 by the fixing screw 87 (FIGS. 4A and 4B). The first moving portion 74 is a portion that supports the upper part of the insertion portion 57 of the right engaging member 55, and the second moving portion 76 is a portion that supports the lower part of the insertion portion 53 of the left engaging member 51.

As shown in FIG. 6B, the first moving portion 74 is located at the upper left end of the first lock portion 71, and the second moving portion 76 is located at the lower right end of the first lock portion 71. The first moving portion 74 includes a moving body 74a, a support portion 74b, and the projection 74c. The support portion 74b is continuous with the moving body 74a and directly supports the insertion portion 57 of the right engaging member 55. The projection 74c projects from the moving body 74a toward the right operation portion 101. Similarly, the second moving portion 76 includes a moving body 76a, a support portion 76b, and the projection 76c. The support portion 76b is continuous with the moving body 76a and directly supports the insertion portion 53 of the left engaging member 51. The projection 76c projects from the moving body 76a toward the left operation portion 91. The moving bodies 74a, 76a have a substantially arc shape as viewed in plan. The support portions 74b, 76b are thinner than the moving bodies 74a, 76a. The projections 74c, 76c have, e.g., a cylindrical shape. As shown in FIG. 5B, the projection 74c is located in the upper recess 103 of the right operation portion 101, and the projection 76c is located in the lower recess 94 of the left operation portion 91.

The first connecting portion 73 includes a first extending portion 73a, a second extending portion 73b, and a connecting portion 73c. The first extending portion 73a extends toward the first moving portion 74. The second extending portion 73b extends in the opposite direction from the first moving portion 74 (toward the second moving portion 76). The connecting portion 73c connects the first extending portion 73a and the second extending portion 73b. The first connecting portion 73 has, e.g., a rod-like shape and elastically supports the first moving portion 74 with respect to the shaft portion 72. The longitudinal length of the first extending portion 73a is larger than that of the second extending portion 73b. The connecting portion 73c that is a bending point of the first connecting portion 73 is located closer to the second moving portion 76 than the shaft portion 72 is in the lateral direction of the first lock portion 71.

Similarly, the second connecting portion 75 includes a first extending portion 75a, a second extending portion 75b, and a connecting portion 75c. The first extending portion 75a extends toward the second moving portion 76. The second extending portion 75b extends in the opposite direction from the second moving portion 76 (toward the first moving portion 74). The connecting portion 75c connects the first extending portion 75a and the second extending portion 75b. The second connecting portion 75 has, e.g., a rod-like shape and elastically supports the second moving portion 76 with respect to the shaft portion 72. The longitudinal length of the first extending portion 75a is larger than that of the second extending portion 75b. The connecting portion 75c that is a bending point of the second connecting portion 75 is located closer to the first moving portion 74 than the shaft portion 72 is in the lateral direction of the first lock portion 71.

As described above, each of the actually measured length of the first connecting portion 73 (the total length of the first extending portion 73a, the second extending portion 73b, and the connecting portion 73c) and the actually measured length of the second connecting portion 75 (the total length of the first extending portion 75a, the second extending portion 75b, and the connecting portion 75c) is larger than the length of a straight line connecting the shaft portion 72 and a corresponding one of the first and second moving portions 74, 76. This configuration achieves reduction in lateral width of the first lock portion 71 and allows the first and second moving portions 74, 76 to be vertically elastically supported.

The second lock portion 81 has substantially the same shape as the first lock portion 71. That is, as shown in FIG. 6C, the second lock portion 81 has a substantially inverted-Z shape as viewed in plan and includes the shaft portion 82, a first moving portion 84, a first connecting portion 83, a second moving portion 86, and a second connecting portion 85. The first moving portion 84 is located below the shaft portion 82. The first connecting portion 83 connects the shaft portion 82 and the first moving portion 84. The second moving portion 86 is located above the shaft portion 82. The second connecting portion 85 connects the shaft portion 82 and the second moving portion 86.

The shaft portion 82 is a through hole located substantially in the center of the second lock portion 81 and extending from the front surface to the back surface of the second lock portion 81. The shaft portion 82 is a portion that is fixed to the housing 62 by the fixing screw 87 (FIGS. 4A and 4B). The first moving portion 84 is a portion that supports the lower part of the insertion portion 57 of the right engaging member 55, and the second moving portion 86 is a portion that supports the upper part of the insertion portion 53 of the left engaging member 51.

As shown in FIG. 6C, the first moving portion 84 is located at the lower left end of the second lock portion 81, and the second moving portion 86 is located at the upper right end of the second lock portion 81. The first moving portion 84 includes a moving body 84a, a support portion 84b, and the projection 84c. The support portion 84b is continuous with the moving body 84a and directly supports the insertion portion 57 of the right engaging member 55. The projection 84c projects from the moving body 84a toward the right operation portion 101. Similarly, the second moving portion 86 includes a moving body 86a, a support portion 86b, and the projection 86c. The support portion 86b is continuous with the moving body 86a and directly supports the insertion portion 53 of the left engaging member 51. The projection 86c projects from the moving body 86a toward the left operation portion 91. The moving bodies 84a, 86a have a substantially arc shape as viewed in plan. The support portions 84b, 86b are thinner than the moving bodies 84a, 86a. The projections 84c, 86c have, e.g., a cylindrical shape. As shown in FIG. 5B, the projection 84c is located in the lower recess 104 of the right operation portion 101, and the projection 86c is located in the upper recess 93 of the left operation portion 91.

The first connecting portion 83 includes a first extending portion 83a, a second extending portion 83b, and a connecting portion 83c. The first extending portion 83a extends toward the first moving portion 84. The second extending portion 83b extends in the opposite direction from the first moving portion 84 (toward the second moving portion 86). The connecting portion 83c connects the first extending portion 83a and the second extending portion 83b. The first connecting portion 83 has, e.g., a rod-like shape and elastically supports the first moving portion 84 with respect to the shaft portion 82. The longitudinal length of the first extending portion 83a is larger than that of the second extending portion 83b. The connecting portion 83c that is a bending point of the first connecting portion 83 is located closer to the second moving portion 86 than the shaft portion 82 is in the lateral direction of the second lock portion 81.

Similarly, the second connecting portion 85 includes a first extending portion 85a, a second extending portion 85b, and a connecting portion 85c. The first extending portion 85a extends toward the second moving portion 86. The second extending portion 85b extends in the opposite direction from the second moving portion 86 (toward the first moving portion 84). The connecting portion 85c connects the first extending portion 85a and the second extending portion 85b. The second connecting portion 85 has, e.g., a rod-like shape and elastically supports the second moving portion 86 with respect to the shaft portion 82. The longitudinal length of the first extending portion 85a is larger than that of the second extending portion 85b. The connecting portion 85c that is a bending point of the second connecting portion 85 is located closer to the first moving portion 84 than the shaft portion 82 is in the lateral direction of the second lock portion 81.

As described above, each of the actually measured length of the first connecting portion 83 (the total length of the first extending portion 83a, the second extending portion 83b, and the connecting portion 83c) and the actually measured length of the second connecting portion 85 (the total length of the first extending portion 85a, the second extending portion 85b, and the connecting portion 85c) is larger than the length of a straight line connecting the shaft portion 82 and a corresponding one of the first and second moving portions 84, 86. This configuration achieves reduction in lateral width of the second lock portion 81 and allows the first and second moving portions 84, 86 to be vertically elastically supported.

As shown in FIGS. 3 and 6A, the first moving portion 74 of the first lock portion 71 and the first moving portion 84 of the second lock portion 81 together form a C shape as viewed in plan and face the through hole 65a of the fixed portion 61. The second moving portion 76 of the first lock portion 71 and the second moving portion 86 of the second lock portion 81 together form an inverted-C shape as viewed in plan and face the through hole 64a of the fixed portion 61. The insertion portion 53 of the left engaging member 51 can thus be engaged by the second moving portions 76, 86 of the first and second lock portions 71, 81, and the insertion portion 57 of the right engaging member 55 can be engaged by the first moving portions 74, 84 of the lock portions 71, 81.

How to Use Buckle

Next, how to use the buckle 5 of the present embodiment will be described.

First, an infant is placed in the seat part 20 of the stroller 1 shown in FIG. 1. The crotch strap 41 is then passed between the infant's thighs. The shoulder strap 44 is placed over the infant's right shoulder, and the waist strap 42 is placed around the infant's right waist. Similarly, the shoulder strap 45 is placed over the infant's left shoulder, and the waist strap 43 is placed around the infant's left waist. The left engaging member 51 connected to the waist strap 42 and the shoulder strap 44 is connected to the engaged member 60 connected to the crotch strap 41. Similarly, the right engaging member 55 connected to the waist strap 43 and the shoulder strap 45 is connected to the engaged member 60 connected to the crotch strap 41. Specifically, as shown in FIGS. 3 and 4B, the insertion portion 53 of the left engagement member 51 is inserted into the through hole 64a of the engaged member 60. The insertion portion 57 of the right engaging member 55 is also inserted into the through hole 65a of the engaged member 60. The infant can thus be secured in the stroller 1.

When taking the infant out of the stroller 1, the left operation portion 91 and the right operation portion 101 in FIG. 2A are pressed inward to disengage the left engaging member 51 and the right engaging member 55 from the engaged member 60 and release the infant from the straps 41 to 45. The infant can thus be taken out of the stroller 1.

Operation of Buckle

Figure 7A:
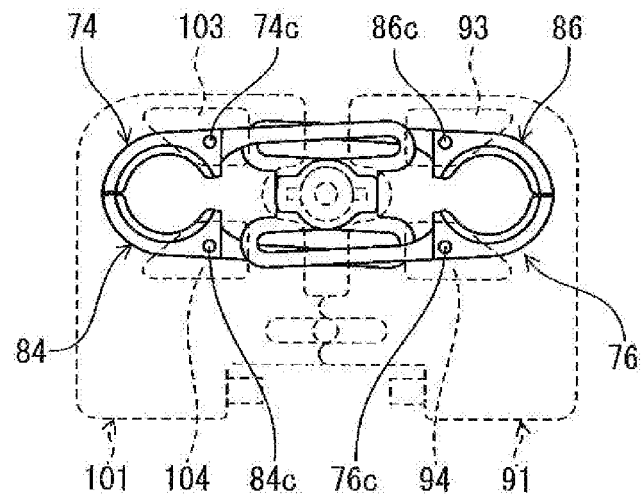
FIGS. 7A and 7B show the operation portions and the lock portion, where
Figure 7B:
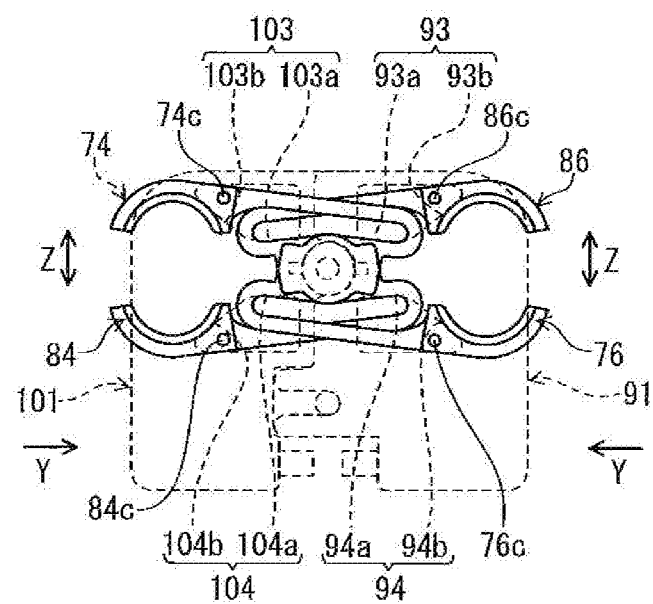

Next, how the engaging members 51, 55 and the engaged member 60 of the buckle 5 operate will be described with reference to FIGS. 7A to 8C. FIGS. 7A and 7B show the operation portions 91, 101 and the lock portion 70. Since FIGS. 7A and 7B illustrate the lock portion 70 as viewed from the back, the operation portions 91, 101 are shown by dashed lines. FIG. 7A shows the operation portions 91, 101 and the lock portion 70 with the operation portions 91, 101 not being operated, and FIG. 7B shows the operation portions 91, 101 and the lock portion 70 with the operation portions 91, 101 being operated. FIGS. 8A to 8C illustrate how the left engaging member 51 and the engaged member 60 operate and does not illustrate how the left engaging member 51 and the engaged member 60 operate. Since the operation of the right engaging member 55 and the engaged member 60 are the same as that of the left engaging member 51 and the engaged member 60, description thereof will be omitted.

First, as shown in FIG. 8A, the insertion portion 53 of the left engaging member 51 is inserted into the through hole 64a of the engaged member 60 in the insertion direction shown by arrow X. The first magnet 54 of the left engaging member 51 has an N pole on the side facing the engaged portion 60. The second magnet 99 of the left operation portion 91 has an S pole on the side facing the insertion portion 53. Accordingly, the insertion portion 53 and the left operation portion 91 attract each other as shown in FIG. 8B. The second projecting portion 53b of the insertion portion 53 is also engaged with the support portions 76b, 86b of the first and second lock portions 71, 81. The insertion portion 53 of the left engaging member 51 is thus engaged with the left operation portion 91 of the engaged member 60 by the magnetic attraction and the structural engagement between the insertion portion 53 of the left engaging member 51 and the lock portion 70. The left engaging member 51 is thus reliably engaged with the engaged member 60.

When disengaging the left engaging member 51 from the engaged member 60, the left engaging member 51 and the engaged member 60 which are in the engaged state as shown in FIG. 7A are brought into the state shown in FIG. 7B. That is, the left operation portion 91 is pressed in the pressing direction shown by arrow Y and thus moved inward. As a result, as shown in FIG. 8C, the third magnet 98 instead of the second magnet 99 faces the first magnet 54. Since the third magnet 98 has an N pole on the side facing the first magnet 54, the third magnet 98 and the first magnet 54 repel each other. As shown in FIG. 7A, the projection 86c of the second lock portion 81 is located in the upper recess 93 of the left operation portion 91, and the projection 76c of the first lock portion 71 is located in the lower recess 94 of the left operation portion 91. Accordingly, by operating the left operation portion 91, the projection 86c moves from the flat portion 93a to the tilted portion 93b of the upper recess 93, and the projection 76c moves from the flat portion 94a to the tilted portion 94b of the lower recess 94, so that the second moving portions 76, 86 of the first and second lock portions 71, 81 open in the opening direction shown by arrow Z.

Similarly, the projection 74c of the first lock portion 71 is located in the upper recess 103 of the right operation portion 101, and the projection 84c of the second lock portion 81 is located in the lower recess 104 of the right operation portion 101. Accordingly, by operating the right operation portion 101, the projection 74c moves from the flat portion 103a to the tilted portion 103b of the upper recess 103, and the projection 84c moves from the flat portion 104a to the tilted portion 104b of the lower recess 104, so that the first moving portions 74, 84 of the first and second lock portions 71, 81 open in the opening direction shown by arrow Z. The second projecting portion 53b of the insertion portion 53 is thus disengaged from the projections 76c, 86c of the second moving portions 76, 86, and the second projecting portion of the insertion portion 57 is disengaged from the projections 74c, 84c of the first moving portions 74, 84.

Since the buckle 5 uses magnetic attraction, the lock operation can be performed by merely inserting the engaging members 51, 55 through the through holes 64a, 65a of the engaged member 60. Since the buckle 5 also uses magnetic repulsion, the unlock operation does not require pulling of the engaging members 51, 55. The unlock operation can be performed by merely operating the operation portions 91, 101. The lock and unlock operations of the buckle 5 of the present embodiment can thus be easily performed.

Since the engaging members 51, 55 are engaged with the engaged member 60 using the lock portion 70 and the magnetic attraction and repulsion, the buckle 5 can be securely fastened. The buckle 5 is therefore optimal for the stroller 1 for which safety is required.

When engaging the engaging members 51, 55 with the engaged member 60, the engaging members 51, 55 need only be placed over the through holes 64a, 65a of the engaged member 60. This configuration simplifies the lock and unlock operations.

In the present embodiment, the two operation portions 91, 101 are provided. This allows the left engaging member 51 and the right engaging member 55 to be operated independently. For example, when taking only the shoulder strap 44 off with the shoulder strap 45 on, the left engaging member 51 can be disengaged from the engaged member 60 by operating only the left operation portion 91.

Second Embodiment

A configuration example of a buckle 5A used in the stroller 1 according to a second embodiment will be described in detail with reference to FIGS. 9 to 13C. The configuration of the stroller 1 is similar to that of the first embodiment except for the configuration of the buckle 5A. Only the differences from the buckle 5 of the first embodiment will be described in detail.

The major differences between the buckle 5 of the first embodiment and the buckle 5A of the present embodiment are the number of operation portions and the number of magnets. That is, the buckle 5 of the first embodiment has two operation portions 91, 101, while the buckle 5A of the second embodiment has a single operation portion 110A. A left engaging member 51A and a right engaging member 55A are disengaged from an engaged member 60A by operating the operation portion 110A. The engaged member 60 of the buckle 5 of the first embodiment has the two second magnets 99, 109 and the two third magnets 98, 108. Namely, the engaged member 60 of the first embodiment has four magnets in total. However, the engaged member 60A of the buckle 5A of the present embodiment has two magnets, namely a second magnet 99A and a third magnet 98A.

Figure 9:
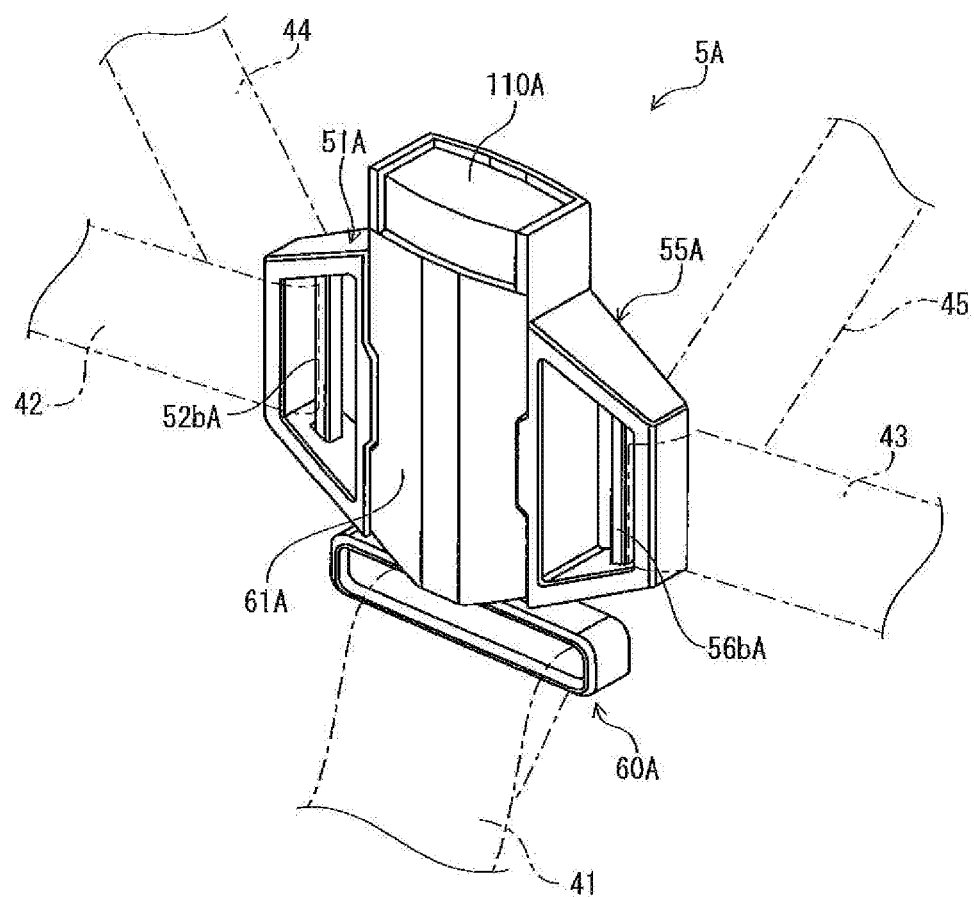
FIG. 9 is a perspective view of a buckle of a second embodiment.

Referring especially to FIG. 9, the buckle 5A of the present embodiment includes the left engaging member 51A, the right engaging member 55A, and the engaged member 60A. The left engaging member 51A is connected to the waist strap 42 and the shoulder strap 44, the right engaging member 55A is connected to the waist strap 43 and the shoulder strap 45, and the engaged member 60A is connected to the crotch strap 41. That is, the engaged member 60A is detachably connected to the left engaging member 51A and the right engaging member 55A.

Left Engaging Member

The left engaging member 51A will be described with reference to FIGS. 10, 11A, and 11B. The left engaging member 51A includes a body 52A, an insertion portion 53A, and a first magnet 54A.

The body 52A has, e.g., a trapezoidal shape as viewed from the front. The body 52A has a standing wall 52aA on the side facing the engaged member 60A. The standing wall 52aA is a flat surface and abuts on the engaged member 60A when in an engaged state. The body 52A has, on the left side of the standing wall 52aA in the figures, an attachment hole 52bA through which the waist strap 42 and the shoulder strap 44 pass. The insertion portion 53A is provided on the right side of the body 52A in the figures. The insertion portion 53A projects outward (toward the engaged member 60A) from the middle part in the up-down direction of the standing wall 52aA. As shown in FIG. 10, the insertion portion 53A has, e.g., a substantially rectangular shape as viewed in plan and has grooves 53aA extending in the up-down direction. The first magnet 54A is mounted in the right end of the insertion portion 53A. As shown in FIGS. 11A and 11B, the first magnet 54A has been magnetized in the engagement direction. Specifically, the left side of the first magnet 54A in the figures is an N pole, and the right side of the first magnet 54A in the figures is an S pole.

Right Engaging Member

The right engaging member 55A will be described with reference to FIGS. 10, 11A, and 11B. The right engaging member 55A includes a body 56A, an insertion portion 57A, and a first magnet 58A.

The body 56A has, e.g., a trapezoidal shape as viewed in plan. The body 56A has a standing wall 56aA on the side facing the engaged member 60A. The standing wall 56aA is a flat surface and abuts on the engaged member 60A when in an engaged state. The body 56A has, on the right side of the standing wall 56aA in the figures, an attachment hole 56bA through which the waist strap 43 and the shoulder strap 45 pass. The insertion portion 57A is provided on the left side of the body 56A in the figures. The insertion portion 57A projects outward (toward the engaged member 60A) from the middle part in the up-down direction of the standing wall 56aA. As shown in FIG. 10, the insertion portion 57A has, e.g., a substantially rectangular shape as viewed in plan and has grooves 57aA extending in the up-down direction. The first magnet 58A is mounted in the left end of the insertion portion 57A. As shown in FIGS. 11A and 11B, the first magnet 58A has been magnetized in the engagement direction. Specifically, the left side of the first magnet 58A in the figures is an N pole, and the right side of the first magnet 58A in the figures is an S pole.

Engaged Member

The engaged member 60A will be described with reference to FIGS. 10, 11A, and 11B. The engaged member 60A includes a fixed portion 61A, an operation portion 110A, and a pair of interposed members 120A, 125A. The configuration of each portion will be described in detail.

Figure 10:
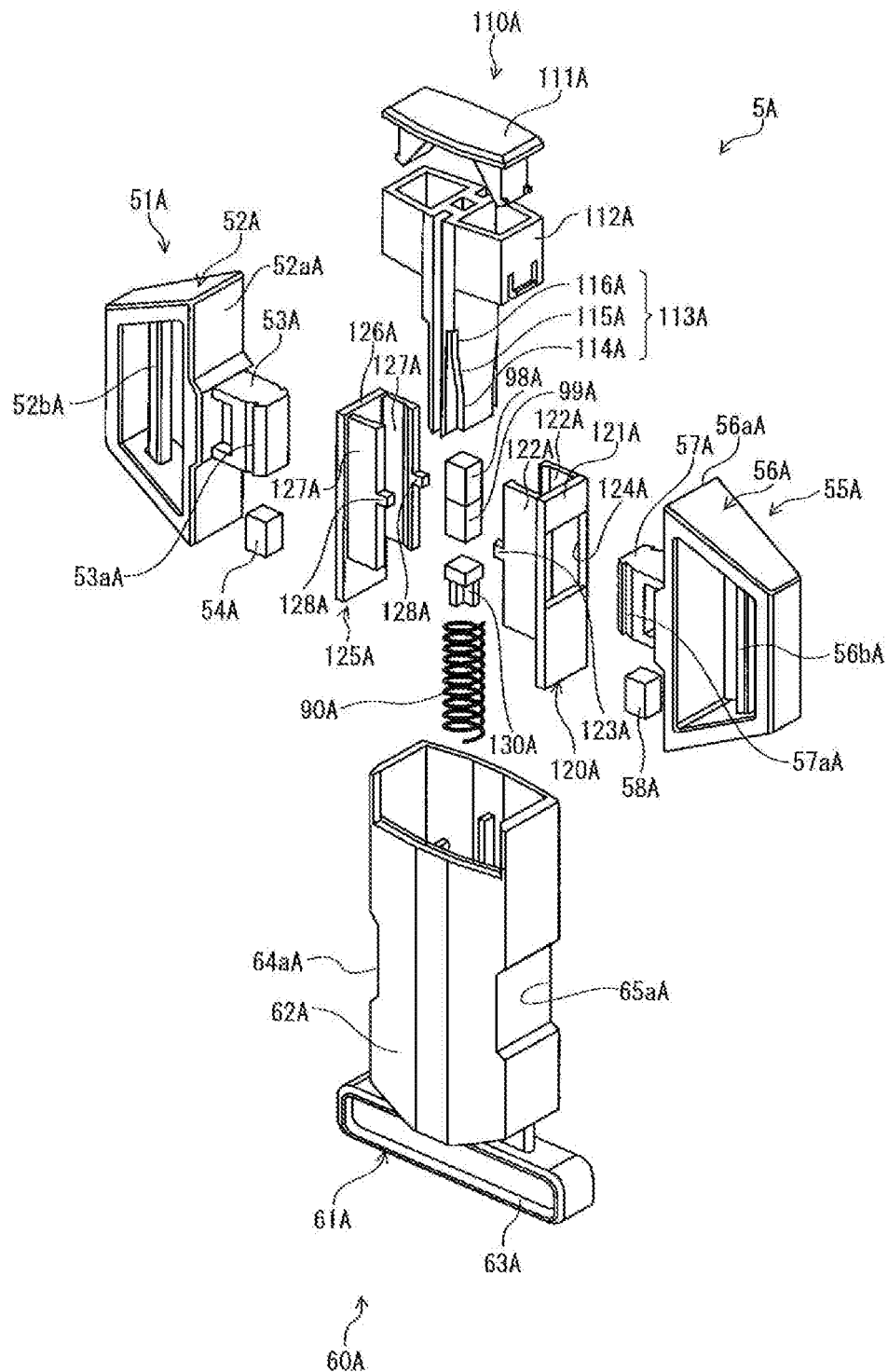
FIG. 10 is an exploded perspective view of the buckle of the second embodiment.

As shown especially in FIG. 10, the fixed portion 61A serves as a case that accommodates the operation portion 110A, the pair of interposed members 120A, 125A, and a spring 90A therein. The fixed portion 61A includes a housing 62A and an attachment hole 63A formed in the lower part of the housing 62A. The crotch strap 41 is passed through the attachment hole 63A. The housing 62A has a box shape that is open upward. The housing 62A has a through hole 64aA in its left side surface. The insertion portion 53A of the left engaging member 51A is inserted through the through hole 64aA. The housing 62A further has a through hole 65aA in its right side surface. The insertion portion 57A of the right engaging member 55A is inserted through the through hole 65aA. The through holes 64aA, 65aA have a substantially rectangular shape and are slightly larger than the insertion holes 53A, 57A as the insertion portions 53A, 57A are inserted therethrough. Since the insertion portions 53A, 57A are completely inserted through the through holes 64aA, 65aA, the standing wall 52aA of the left engaging member 51A abuts on the left side surface of the housing 62A when in an engaged state, and the standing wall 56aA of the right engaging member 55A abuts on the right side surface of the housing 62A when in an engaged state. The engaging members 51A, 55A are therefore less likely to be disengaged from the engaged member 60A by an external impact.

The operation portion 110A will be described with reference to FIG. 10. The operation portion 110A is disposed at such a position that it faces the pair of through holes 64aA, 65aA. The operation portion 110A can be moved in the up-down direction with respect to the fixed portion 61A. The operation portion 110A includes an operation body 112A, guide portions 113A, a second magnet 99A, and a third magnet 98A. The guide portions 113A are formed on the operation body 112A. The operation body 112A has a lid 111A that covers the entire operation body 112A from above.

Figure 12A:
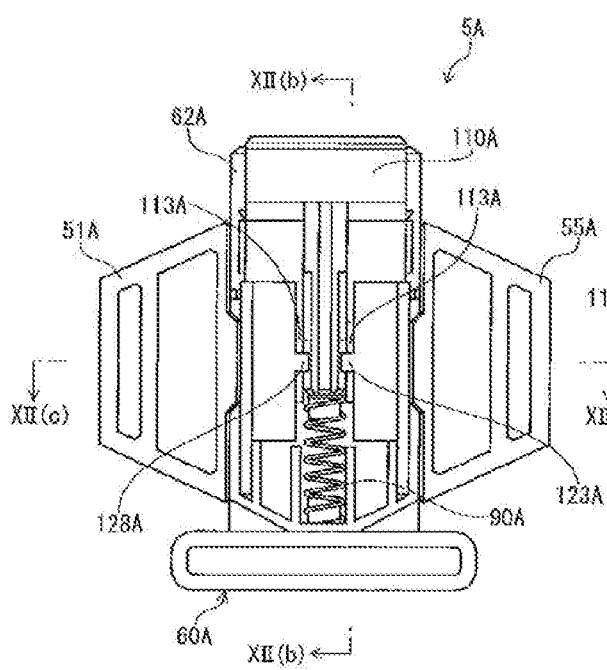
FIGS. 12A to 12C show the engaging members engaged with the engaged member, where
Figure 12B:
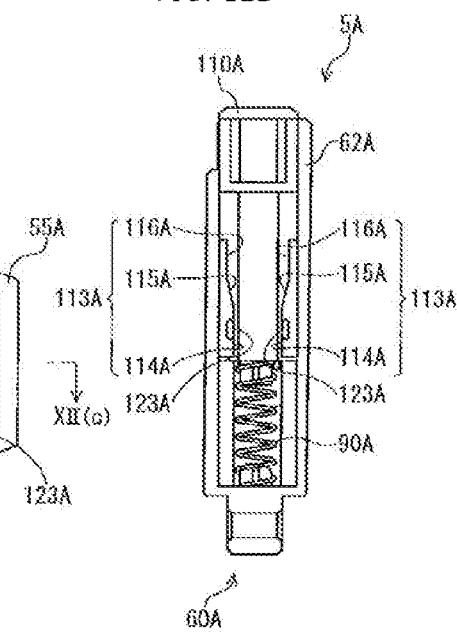
Figure 12C:
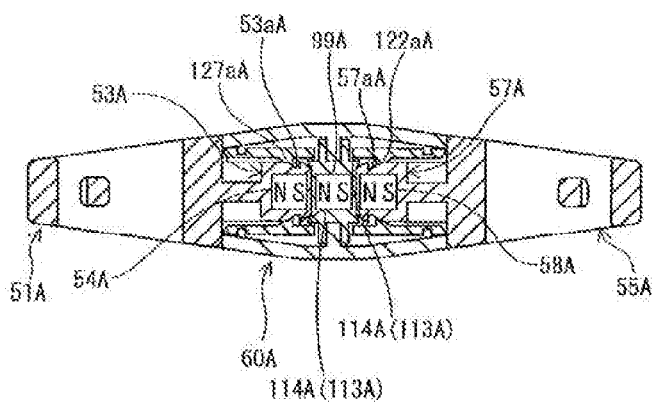
Figure 13A:
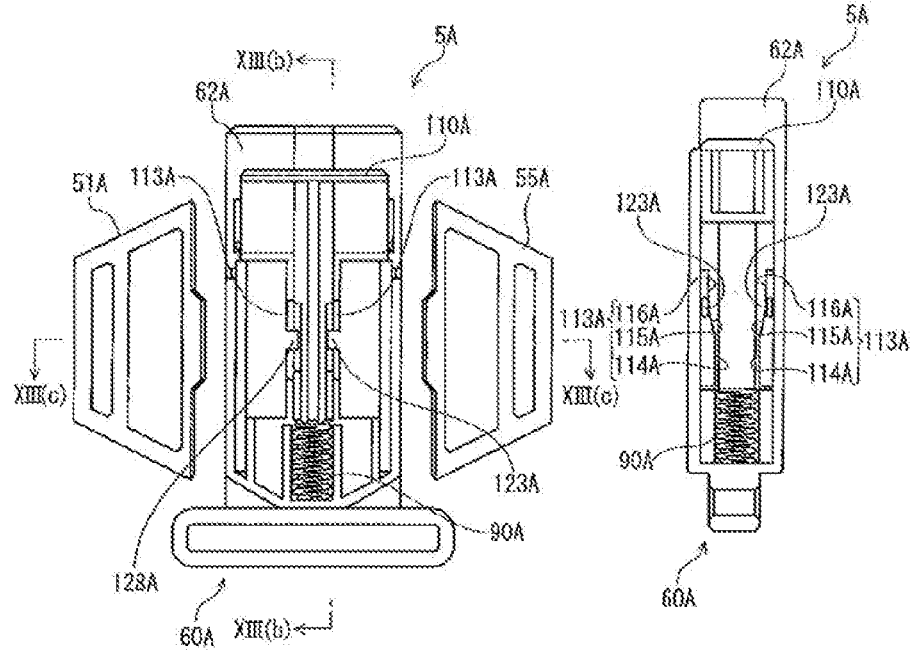
FIGS. 13A to 13C show the engaging members disengaged from the engaged member, where
Figure 13B:
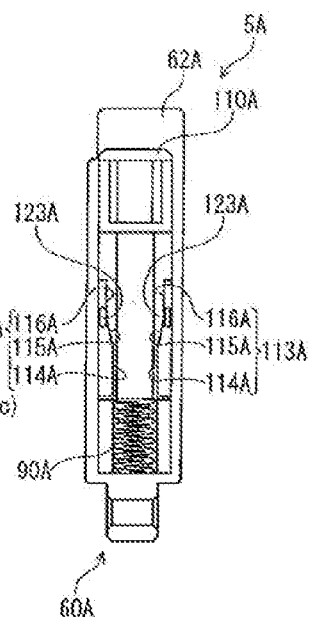

The guide portion 113A guides projections 123A, 128A of the interposed members 120A, 125A described later. The operation portion 110A has a total of two pairs of the guide portions 113A on its both side ends (on the left engaging member 51A side and the right engaging member 55A side), one pair on each side end. As shown in FIGS. 12B and 13B, each pair of guide portions 113A is formed by a pair of first flat portions 114A, a pair of tilted portions 115A, and a pair of second flat portions 116A such that the first flat portion 114A, the tilted portion 115A, and the second flat portion 116A are continuous with each other. The interval between the pair of first flat portions 114A is smaller than that between the pair of second flat portions 116A. That is, the pair of guide portion 113A is designed so that the interval between the pair of guide portions 113A increases as it gets farther away from the pair of first flat portions 114A and closer to the pair of second flat portions 116A.

The second magnet 99A is located under the third magnet 98A. These magnets 98A, 99A are supported from below by a stopper 130A. The stopper 130A also serves to support the spring 90A. The spring 90A is sandwiched between the housing 62A and the stopper 130A. The operation portion 110A is always biased upward by the spring 90A.

The pair of interposed members 120A, 125A are mounted in the housing 62A. Referring to FIGS. 10, 11A, and 11B, the left interposed member 125A has a U shape in section and includes an end wall 126A and a pair of side walls 127A projecting from both ends of the end wall 126A. The end wall 126A has a through hole 129A substantially in the middle in the up-down direction. The through hole 129A is formed at such a position that it overlaps the through hole 65aA of the housing 62A. Since the through hole 129A is a portion through which the insertion portion 53A of the left engaging member 51A is inserted, the through hole 129A is slightly larger than the insertion portion 53A. Each of the side walls 127A has the projection 128A in the middle in the up-down direction. The projections 128A of the side walls 127A project inward. The projections 128A are guided by the guide portions 113A of the operation portion 110A.

The right interposed member 120A will be described. The right interposed member 120A has substantially the same shape as the left interposed member 125A. That is, the right interposed member 120A has a U shape in section and includes an end wall 121A and a pair of side walls 122A projecting from both ends of the end wall 121A. The end wall 121A has a through hole 124A substantially in the middle in the up-down direction. Since the through hole 124A is a portion through which the insertion portion 57A of the right engaging member 55A is inserted, the through hole 124A is slightly larger than the insertion portion 57A. Each of the side walls 122A has the projection 123A in the middle in the up-down direction. The projections 123A are guided by the guide portions 113A of the operation portion 110A.

Operation of Buckle

Next, how the engaging members 51A, 55A and the engaged member 60A of the buckle 5A operate will be described with reference to FIGS. 11A to 13C.

Figure 11A:
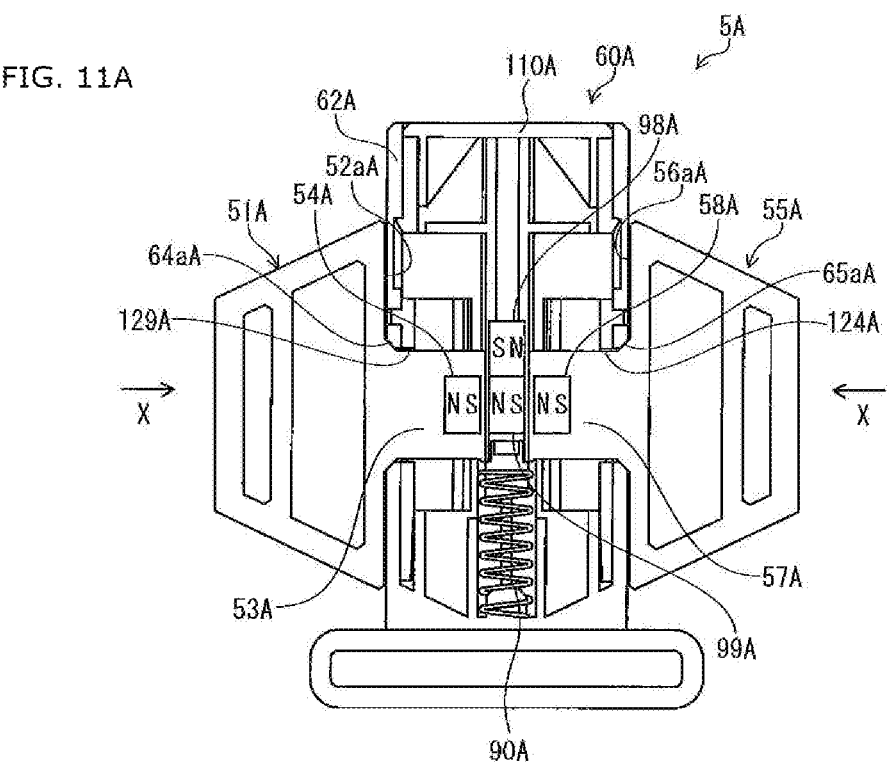
FIGS. 11A and 11B are longitudinal sections of the buckle of the second embodiment, where
Figure 11B:
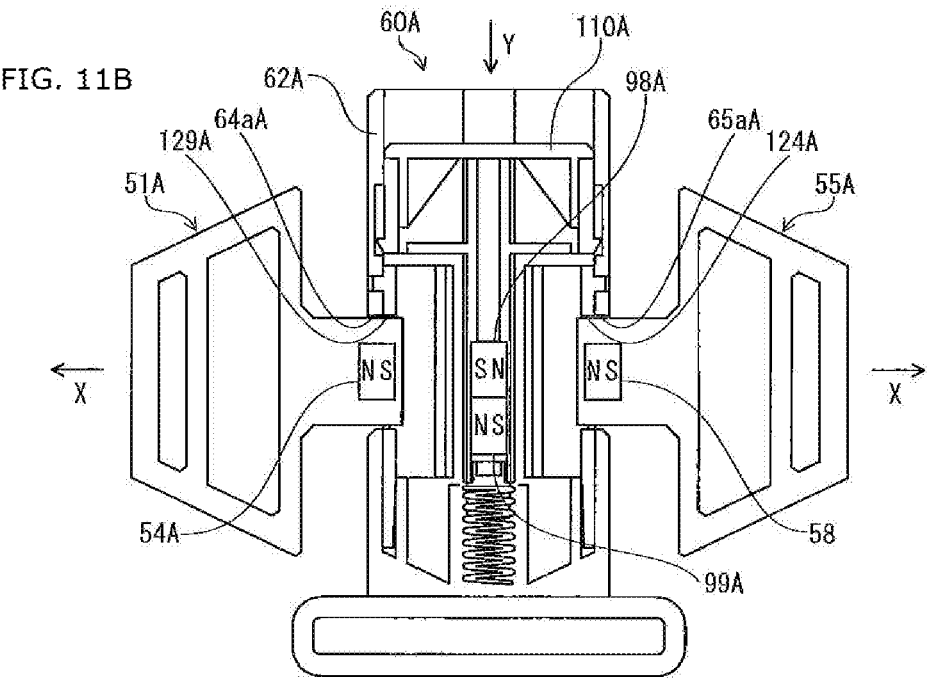

First, as shown in FIG. 11A, the insertion portion 53A of the left engaging member 51A is inserted into the through hole 64aA of the engaged member 60A in the insertion direction shown by arrow X. The first magnet 54A of the left engaging member 51A thus faces the second magnet 99A of the operation portion 110A. The first magnet 54A of the left engaging member 51A has an S pole on the side facing the engaged portion 60A. The second magnet 99A of the operation portion 110A has an N pole on the side facing the insertion portion 53A. Accordingly, the insertion portion 53A and the operation portion 110A attract each other as shown in FIGS. 11A and 12A to 12C. As shown especially in FIG. 12C, the grooves 53aA of the insertion portion 53A are engaged with projecting portions 127aA of the left interposed member 125A. The left engaging member 51A is thus engaged with the engaged member 60A due to the magnetic attraction and the engagement between the insertion portion 53A and the left interposed member 125A. In this case, as shown in FIG. 12B, the projections 128A of the left interposed member 125A are located on the first flat portions 114A of the guide portions 113A.

Similarly, the insertion portion 57A of the right engaging member 55A is inserted into the through hole 65aA of the engaged member 60A in the insertion direction shown by arrow X. The first magnet 58A of the right engaging member 55A thus faces the second magnet 99A of the operation portion 110A. The first magnet 58A of the right engaging member 55A has an N pole on the side facing the engaged portion 60A. The second magnet 99A of the operation portion 110A has an S pole on the side facing the insertion portion 57A. Accordingly, the insertion portion 57A and the operation portion 110A attract each other as shown in FIGS. 11A and 12A to 12C. As shown especially in FIG. 12C, the grooves 57aA of the insertion portion 57A are engaged with projecting portions 122aA of the right interposed member 120A. The right engaging member 55A is thus engaged with the engaged member 60A due to the magnetic attraction and the engagement between the insertion portion 57A and the right interposed member 120A. In this case, as shown in FIG. 12B, the projections 123A of the right interposed member 120A are located on the first flat portions 114A of the guide portions 113A.

When disengaging the left engaging member 51A and the right engaging member 55A from the engaged member 60A, the left engaging member 51A, the right engaging member 55A, and the engaged member 60A which are in the engaged state are brought into the state shown in FIGS. 11B and 13A to 13C. That is, the operation portion 110A is pressed in the pressing direction (downward) shown by arrow Y. The third magnet 98A of the operation portion 110A thus faces the first magnet 54A of the insertion portion 53A and the first magnet 58A of the insertion portion 57A. Since the third magnet 98A has an S pole on the side facing the first magnet 54A and has an N pole on the side facing the first magnet 58A, the third magnet 98A repels the first magnets 54A, 58A.

Figure 13C:
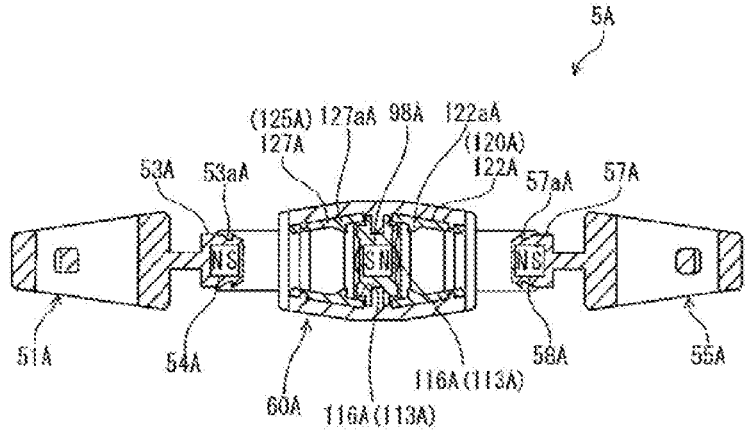

As shown in FIG. 13B, when the operation portion 110A is pressed, the projections 123A, 128A (the projections 128A are not shown) move from the flat portions 114A to the second flat portions 116A through the tilted portions 115A of the guide portions 113A. As shown in FIGS. 13B and 13C, the interval between the side walls 122A of the right interposed member 120A and the interval between the side walls 127A of the left interposed member 125A increase accordingly. As a result, the projecting portions 122aA of the right interposed member 120A are disengaged from the grooves 57aA of the insertion portion 57A, and the projecting portions 127aA of the left interposed member 125A are disengaged from the grooves 53aA of the insertion portion 53A. The left engaging member 51A and the right engaging member 55A can thus be disengaged from the engaged member 60A.

As described above, in the buckle 5A of the present embodiment, the left engaging member 51A and the right engaging member 55A can be operated using one operation portion 110A. That is, the left engaging member 51A and the right engaging member 55A can be simultaneously disengaged by merely pressing the operation portion 110A. The shoulder straps 45, 44 can thus be simultaneously taken off.

Third Embodiment

A configuration example of a buckle 5B used in the stroller 1 according to a third embodiment will be described in detail with reference to FIGS. 14 to 16C. The configuration of the stroller 1 is similar to that of the first embodiment except for the configuration of the buckle 5B. Only the differences from the buckle 5 of the first embodiment will be described in detail.

The major difference between the buckle 5 of the first embodiment and the buckle 5B of the present embodiment is the shape of the operation portion of the engaged member. That is, the operation portions 91, 101 of the engaged member 60 of the first embodiment have a rectangular shape as viewed in plan and are disposed vertically symmetrically, while operation portions 91B, 101B of an engaged member 60B of the present embodiment have a substantially L shape or a substantially inverted-L shape as viewed in plan and are disposed vertically symmetrically with their substantially middle parts in the lateral direction overlapping each other in the up-down direction. The shape of engaging members 51B, 55B of the present embodiment is also different from that of the engaging members 51, 55 of the first embodiment. The engaging members 51B, 55B will be described later.

Engaged Member

Figure 14:
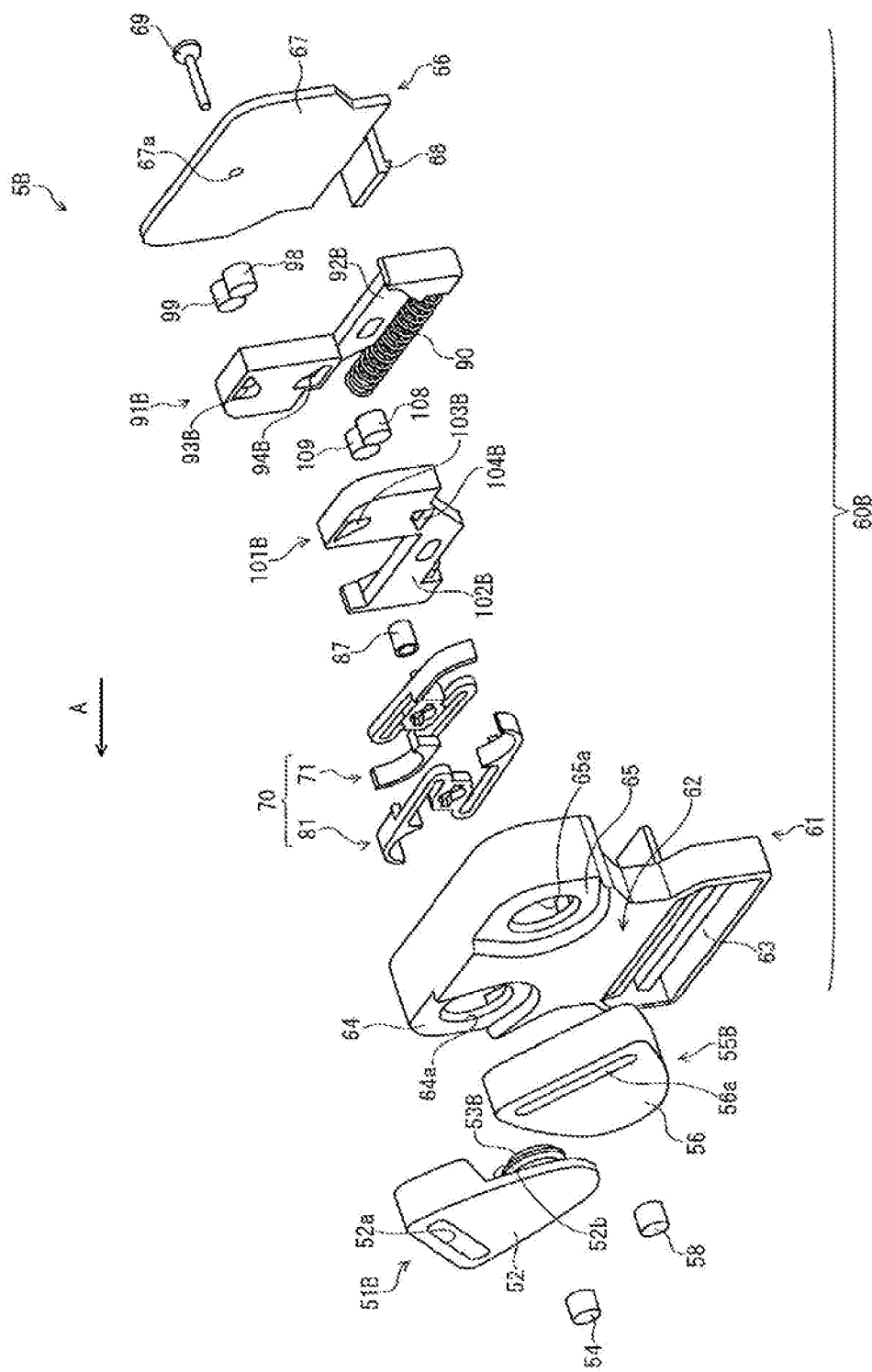
FIG. 14 is an exploded perspective view of a buckle of a third embodiment.

The engaged member 60B of the present embodiment will be described with reference especially to FIGS. 14, 15A, and 15B. The left operation portion 91B and the right operation portion 101B of the engaged member 60B can be moved in the operation direction, that is, the left-right direction shown by arrow B. An operation body 92B of the left operation portion 91B includes a first operation body 92*a*B and a second operation body 92*b*B. The first operation body 92*a*B extends in the left-right direction, and the second operation body 92*b*B projects upward from one end (the right end in FIGS. 15A and 15B) of the first operation body 92*a*B. The other end (the left end in FIGS. 15A and 15B) of the first operation body 92*a*B is exposed from the housing 62. The first operation body 92*a*B has a through hole 96B formed at the same position in the up-down direction as a stopper 62*a* and extending in the left-right direction. The second operation body 92*b*B has an upper recess 93B, a lower recess 94B, the second magnet 99, and the third magnet 98. Unlike the first embodiment, a tilted portion 93*b*B of the upper recess 93B and a tilted portion 94*b*B of the lower recess 94B are located on the inner side in the operation direction (the side facing a second operation body 102*b*B).

Figure 16A:
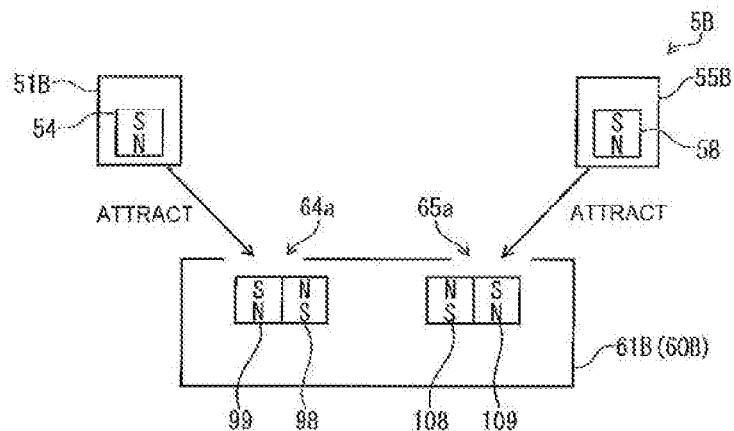
FIGS. 16A to 16C are schematic views illustrating how the engaging members and the engaged member of the third embodiment operate.
Figure 16B:
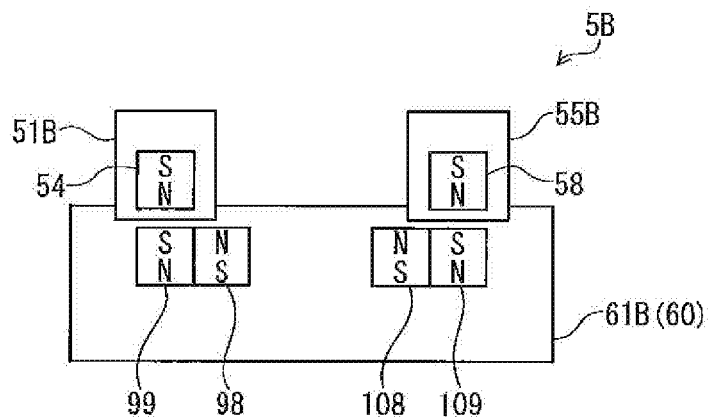
Figure 16C:
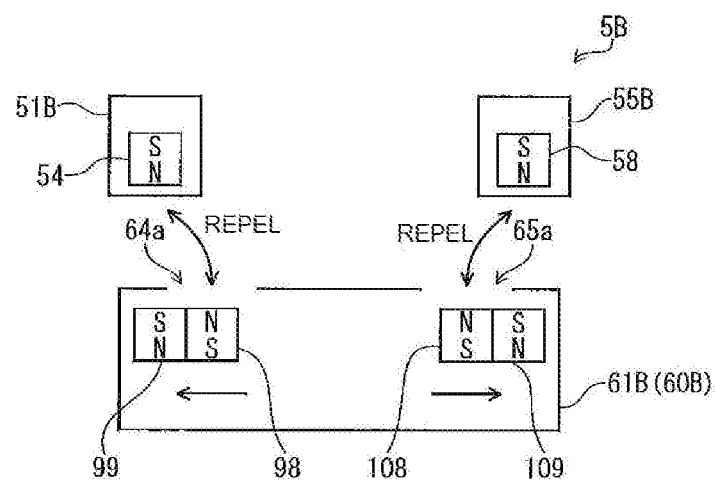

The second magnet 99 is mounted on the outer side in the operation direction (the side not facing the second operation body 102*b*B), and the third magnet 98 is mounted on the inner side in the operation direction (the side facing the second operation body 102*b*B). When the first operation body 92*a*B is not operated, the second magnet 99 faces the through hole 64*a* (FIG. 16A). When the first operation body 92*a*B is pressed, the third magnet 98 faces the through hole 64*a* (FIG. 16C). The second magnet 99 has been magnetized in the direction from the front surface toward the back surface of the left operation portion 91B (engagement direction). Specifically, the front side of the second magnet 99 is an S pole and the back side of the second magnet 99 is an N pole. Like the second magnet 99, the third magnet 98 has been magnetized in the direction from the front surface toward the back surface of the left operation portion 91B (engagement direction). The third magnet 98 is opposite in polarity from the second magnet 99. Namely, the front side of the third magnet 98 is an N pole and the back side of the third magnet 98 is an S pole.

The right operation portion 101B has substantially the same shape as the left operation portion 91B. That is, an operation body 102B of the right operation portion 101B includes a first operation body 102*a*B and a second operation body 102*b*B. The first operation body 102*a*B extends in the left-right direction, and the second operation body 102*b*B projects upward from one end (the left end in FIGS. 15A and 15B) of the first operation body 102*a*B. The other end (the right end in FIGS. 15A and 15B) of the first operation body 102*a*B is exposed from the housing 62. The first operation body 102*a*B has a through hole 106B formed at the same position in the up-down direction as the stopper 62*a* and extending in the left-right direction. The second operation body 102*b*B has an upper recess 103B, a lower recess 104B, the second magnet 109, and the third magnet 108. A tilted portion 103*b*B of the upper recess 103B and a tilted portion 104*b*B of the lower recess 104B are located on the inner side in the operation direction (the side facing the second operation body 92*b*B).

Figure 15A:
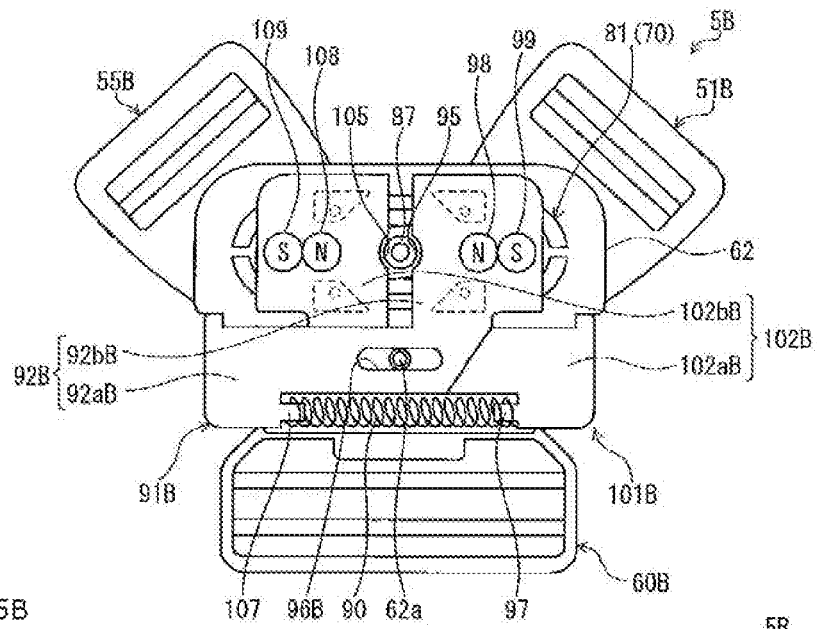
FIGS. 15A and 15B are rear views of an engaged member with a cover removed, illustrating how operation portions operate, where
Figure 15B:
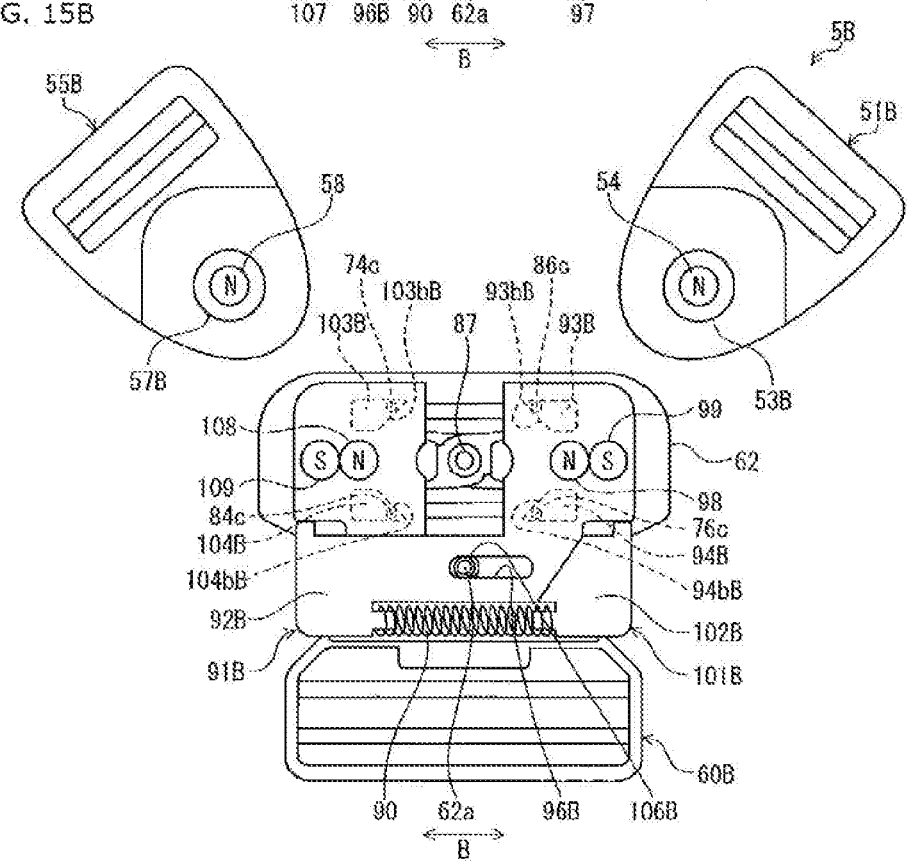

By operating the first operation bodies 92*a*B, 102*a*B, the engaged member 60B is displaced from the state shown in FIG. 15A to the state shown in FIG. 15B. Specifically, the second operation body 92*b*B is moved outward (to the right in FIGS. 15A and 15B), and the second operation body 102*b*B is also moved outward (to the left in FIGS. 15A and 15B), so that the second operation bodies 92*b*B, 102*b*B are separated from each other. The projections 74*c*, 86*c* of the lock portion 70 are moved along the tilted portions 103*b*B, 93*b*B of the upper recesses 103B, 93B, and the projections 76*c*, 84*c* of the lock portion 70 are moved along the tilted portions 94*b*B, 104*b*B of the lower recesses 94B, 104B. The subsequent operation is similar to that of the first embodiment.

The second magnet 109 is mounted on the outer side in the operation direction (the side not facing the second operation body 92*b*B), and the third magnet 108 is mounted on the inner side in the operation direction (the side facing the second operation body 92*b*B). When the first operation body 102*a*B is not operated, the second magnet 109 faces the through hole 65*a* (FIG. 16A). When the first operation body 102*a*B is pressed, the third magnet 108 faces the through hole 65*a* (FIG. 16C). The second magnet 109 has been magnetized in the direction from the front surface toward the back surface of the right operation portion 101B (engagement direction). Specifically, the front side of the second magnet 109 is an S pole and the back side of the second magnet 109 is an N pole. Like the second magnet 109, the third magnet 108 has been magnetized in the direction from the front surface toward the back surface of the right operation portion 101B (engagement direction). The third magnet 108 is opposite in polarity from the second magnet 109. Namely, the front side of the third magnet 108 is an N pole and the back side of the third magnet 108 is an S pole.

Operation of Buckle

Before describing operation of the buckle 5B of the third embodiment, how the buckle 5 of the first embodiment operates by magnetic attraction or repulsion will be described with reference to FIGS. 17A to 17C.

Figure 17A:
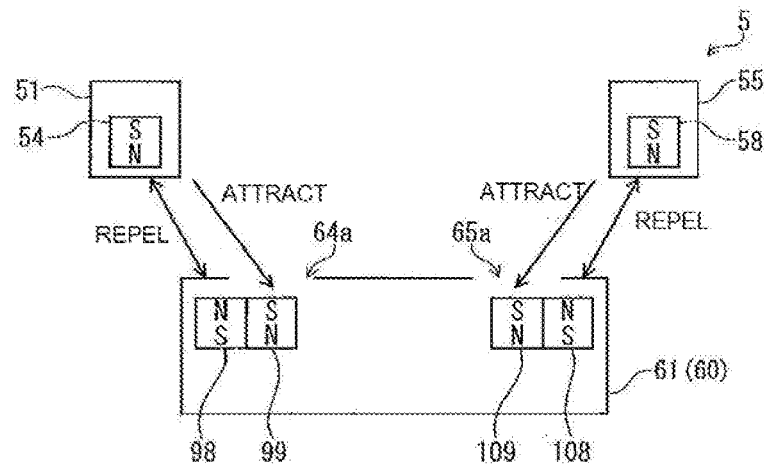
FIGS. 17A to 17C are schematic views illustrating how the engaging members and the engaged member of the first embodiment operate.
Figure 17B:
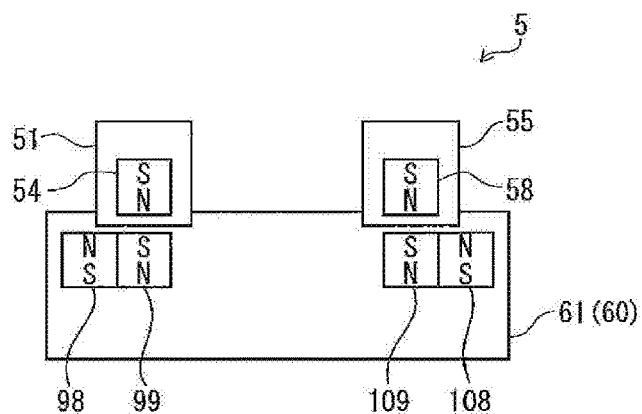

As shown in FIG. 17A, the first magnets 54, 58 of the engaging members 51, 55 of the first embodiment have an N pole on the side facing the engaged member 60. Since the second magnets 99, 109 facing the through holes 64*a*, 65*a* of the engaged member 60 have an S pole on the through hole 64*a*, 65*a* side, the first magnets 54, 58 and the second magnets 99, 109 attract each other, so that the engaging members 51, 55 are engaged with the engaged member 60 as shown in FIG. 17B. In this case, the third magnets 98, 108 located on the outer side of the second magnets 99, 109 have an N pole on the through hole 64*a*, 65*a* side (the front side of the fixed portion 61). Namely, the polarity on the through hole 64*a*, 65*a* side of the third magnets 98, 108 is the same as that on the through hole 64*a*, 65*a* side of the first magnets 54, 58 of the engaging members 51, 55. Accordingly, in the case where the left engaging member 51 is moved rightward along the engaged member 60 from the left side of the engaged member 60 and the right engaging member 55 is moved leftward along the engaged member 60 from the right side of the engaged member 60 in order to engage the engaging members 51, 55 with the engaged member 60, the first magnets 54, 58 and the third magnets 98, 108 repel each other as shown in FIG. 17A, and the engaging members 51, 55 may not be quickly engaged with the engaged member 60.

Figure 17C:
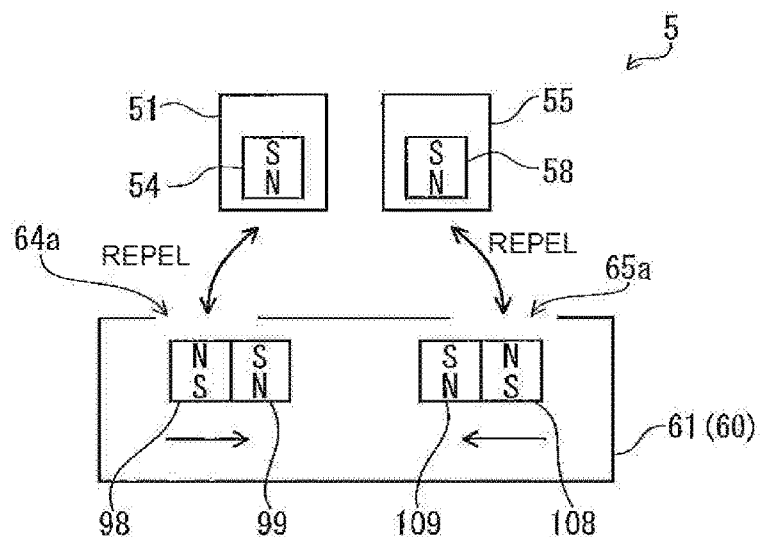

When disengaging the engaging members 51, 55 from the engaged member 60, the operation portions 91, 101 (FIGS. 4A and 4B) are operated to move the third magnets 98, 108 of the engaged member 60 toward the through holes 64*a*, 65*a* (toward the inner side of the engaged member 60 shown by arrows) as shown in FIG. 17C. Since the N poles of the third magnets 98, 108 and the N poles of the first magnets 54, 58 thus face each other and repel, the engaging members 51, 55 are disengaged from the engaged member 60. Since the second magnets 99, 109 that attract the first magnets 54, 58 are moved inward, the left engaging member 51 is ejected inward (toward the middle of the figure) and the right engaging member 55 is also ejected inward (toward the middle of the figure), as shown in FIG. 17C. Accordingly, when the engaging members 51, 55 are disengaged from the engaged member 60, the engaging members 51, 55 remain on the abdomen of the infant seated in the seat part 20 (FIG. 1). The infant therefore may not be smoothly taken out of the stroller 1.

In the present embodiment, however, as shown in FIG. 16A, the first magnets 54, 58 of the engaging members 51B, 55B have an N pole on the side facing the engaged member 60B. Since the second magnets 99, 109 facing the through holes 64a, 65a of the engaged member 60B have an S pole on the through hole 64a, 65a side, the first magnets 54, 58 and the second magnets 99, 109 attract each other, so that the engaging members 51B, 55B are engaged with the engaged member 60B as shown in FIG. 16B. In this case, the third magnets 98, 108 have an N pole on the through hole 64a, 65a side (the front side of the fixed portion 61B). Namely, the polarity on the through hole 64a, 65a side of the third magnets 98, 108 is the same as that on the through hole 64a, 65a side of the first magnets 54, 58 of the engaging members 51B, 55B. The third magnets 98, 108 are located on the inner side of the second magnets 99, 109. Accordingly, even when the right engaging member 55B is moved leftward along the engaged member 60B from the right side of the engaged member 60B and the left engaging member 51B is moved rightward along the engaged member 60B from the left side of the engaged member 60B, the third magnets 98, 108 will not hinder the first magnets 54, 58 and the second magnets 99, 109 from attracting each other. The engaging members 51B, 55B can thus be quickly engaged with the engaged member 60B.

When disengaging the engaging members 51B, 55B from the engaged member 60B, the operation portions 91B, 101B (FIGS. 15A and 15B) are operated to move the third magnets 98, 108 of the engaged member 60B toward the through holes 64a, 65a as shown in FIG. 16C. Since the N poles of the third magnets 98, 108 and the N poles of the first magnets 54, 58 thus face each other and repel, the engaging members 51B, 55B are disengaged from the engaged member 60B. In this case, the second magnets 99, 109 and the third magnets 98, 108 are moved outward as shown by arrows when the operation portions 91B, 101B (FIGS. 15A and 15B) are operated. Since the second magnets 99, 109 that attract the first magnets 54, 58 are moved outward, the left engaging member 51B is ejected outward (toward the left side of the figure) and the right engaging member 55B is also ejected outward (toward the right side of the figure), as shown in FIG. 16C. Accordingly, when the engaging members 51B, 55B are disengaged from the engaged member 60B, the engaging members 51B, 55B are ejected toward both sides of the infant seated in the seat part 20 (FIG. 1). The infant therefore can be smoothly taken out of the stroller 1.

Next, how the engaging members 51, 55 operate when the engaging members 51, 55 are disengaged from the engaged member 60B in a buckle 5Ba including the engaged member 60B of the present embodiment and the engaging members 51, 55 of the first embodiment will be described in detail with reference to FIGS. 18A to 18D.

Figure 18A:
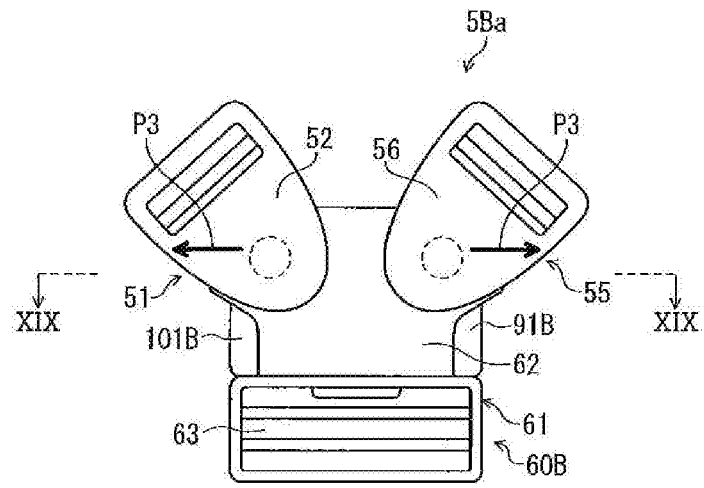
FIGS. 18A to 18D are schematic views illustrating operation of a buckle using the engaging members of the first embodiment and the engaged member of the third embodiment, where
Figure 18B:
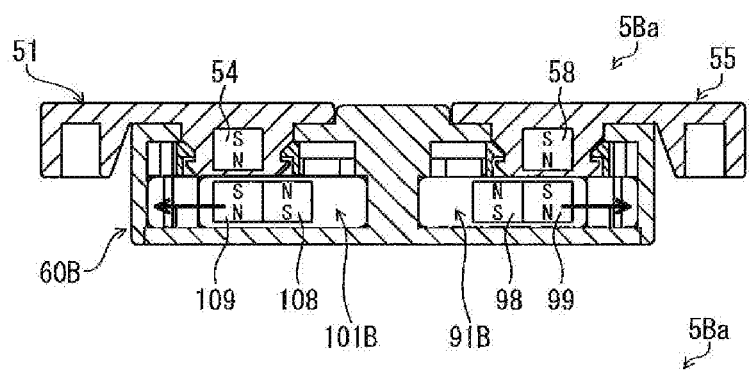
Figure 18C:
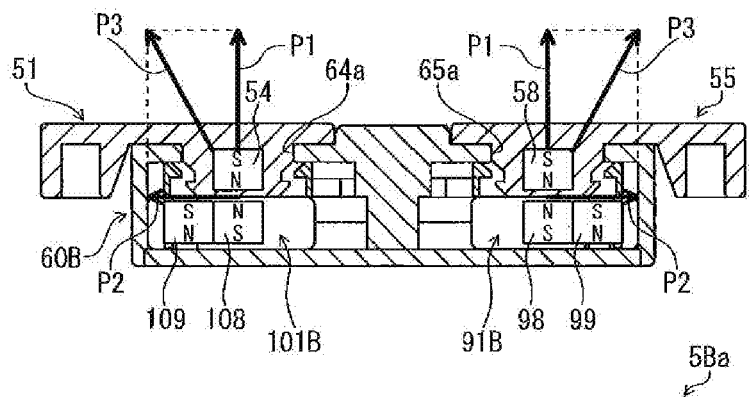

The buckle 5Ba changes from the state of FIG. 18B to the state of FIG. 18C when the operation portions 91B, 101B are pressed. That is, since the first magnets 54, 58 of the engaging members 51, 55 face the third magnets 108, 98 of the engaged member 60B, the N poles of the first magnets 54, 58 face the N poles of the third magnets 108, 98. Accordingly, each of the engaging members 51, 55 is subjected to the repelling force in the direction shown by arrow P1 (the direction in which the operation portions 91B, 101B are moved). At the same time, with the movement of the operation portions 91B, 101B, the engaging portions 51, 55 are subjected to the attracting force in the direction shown by arrow P2 (the direction in which the first magnets 54, 58 are attracted to the second magnets 109, 99). Accordingly, the engaging members 51, 55 are ejected from the through holes 64a, 65a in the direction shown by arrow P3 (the direction extending obliquely upward toward the outside).

Figure 18D:
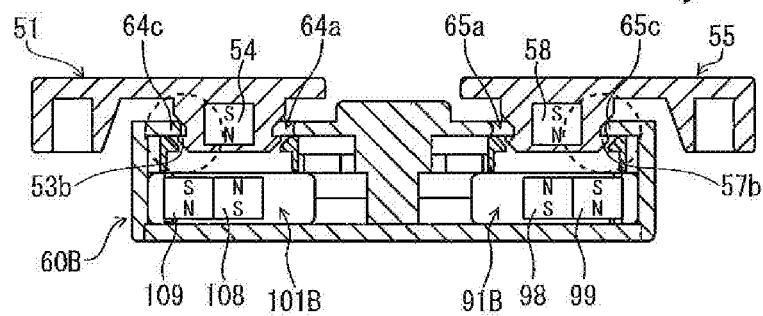
Figure 19A:
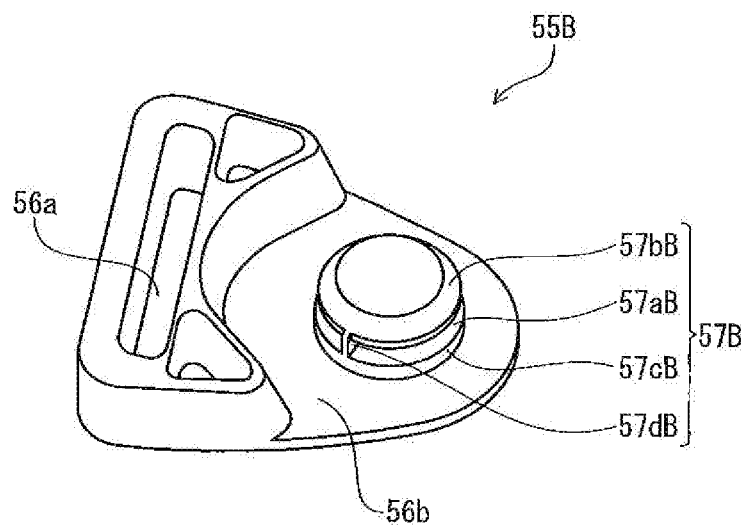
FIG. 19A is a perspective view of the engaging member of the third embodiment.
Figure 19B:
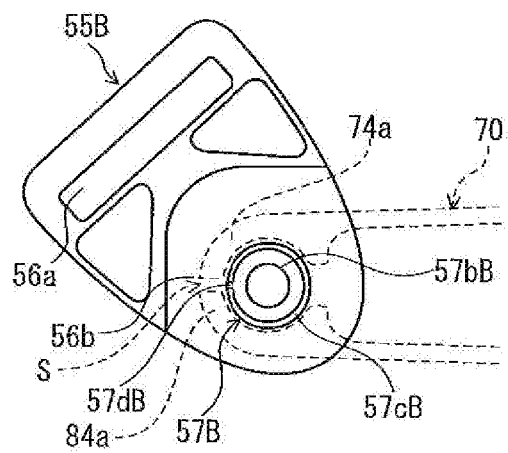
FIG. 19B is a rear view thereof.

As a result, as shown by dashed circles in FIG. 18D, the projecting portions 53b, 57b of the engaging members 51, 55 are caught by walls 64c, 65c of the through holes 64a, 65a, and the engaging members 51, 55 cannot be smoothly disengaged from the engaged member 60B. As shown in FIGS. 19A and 19B, the engaging members 51B, 55B of the present embodiment are therefore configured as described below in order to reduce or eliminate the possibility that the projecting portions 53b, 57b of the engaging members 51B, 55B may be caught by the walls 64c, 65c of the through holes 64a, 65a.

Engaging Members

The engaging members 51B, 55B have a movement restricting portion on the outer side in the operation direction of the operation portions 91B, 101B. The movement restricting portions of the engaging members 51B, 55B restrict the insertion portions 53B, 57B from moving outward in the operation direction within the through holes 64a, 65a while the insertion portions 53B, 57B are located in the through holes 64a, 65a. The shape of the movement restricting portions will be described in detail.

FIGS. 19A and 19B show the right engaging member 55B. Referring to FIGS. 19A and 19B, the insertion portion 57B of the right engaging member 55B includes a first projecting portion 57cB, a slit portion 57aB, and a second projecting portion 57bB. The first projecting portion 57cB projects from the stepped portion 56b. The slit portion 57aB is continuous with the first projecting portion 57cB and is recessed inward with respect to the first projecting portion 57cB. The second projecting portion 57bB is continuous with the slit portion 57aB. The insertion portion 57B has a rib 57dB in a part of the slit portion 57aB, and the rib 57dB connects the first projecting portion 57cB and the second projecting portion 57bB. Specifically, the rib 57dB extends in the up-down direction along the entire length in the up-down direction of the slit portion 57aB. The rib 57dB is formed on the outer side in the operation direction of the operation portion 101B. In other words, the rib 57dB is formed at a position in the direction in which the right engaging portion 55B is ejected (the direction shown by the arrow in FIG. 18A). The rib 57dB is thus formed at a position corresponding to the space S that is created between the first moving portions 74a, 84a of the lock portion 70 when the right engaging member 55 is engaged with the engaged member 60B. Such a rib 57dB serves as the movement restricting portion.

Since the insertion portion 57B has such a rib 57dB, the rib 57dB contacts the wall 64c (FIG. 18D) of the through hole 64a, and the right engaging member 55B is not ejected obliquely upward toward the outside, but is ejected upward from the through hole 64a. In this configuration, the second projecting portion 57b therefore will not be caught by the wall 64a of the through hole 65a in the manner described with respect to FIG. 18D, and the right engaging member 55B can be smoothly disengaged from the engaged member 60B. Although the right engaging member 55B is described above, the left engaging member 51B has a shape similar to that of the right engaging member 55B.

Modifications of Movement Restricting Portion

Figure 20A:
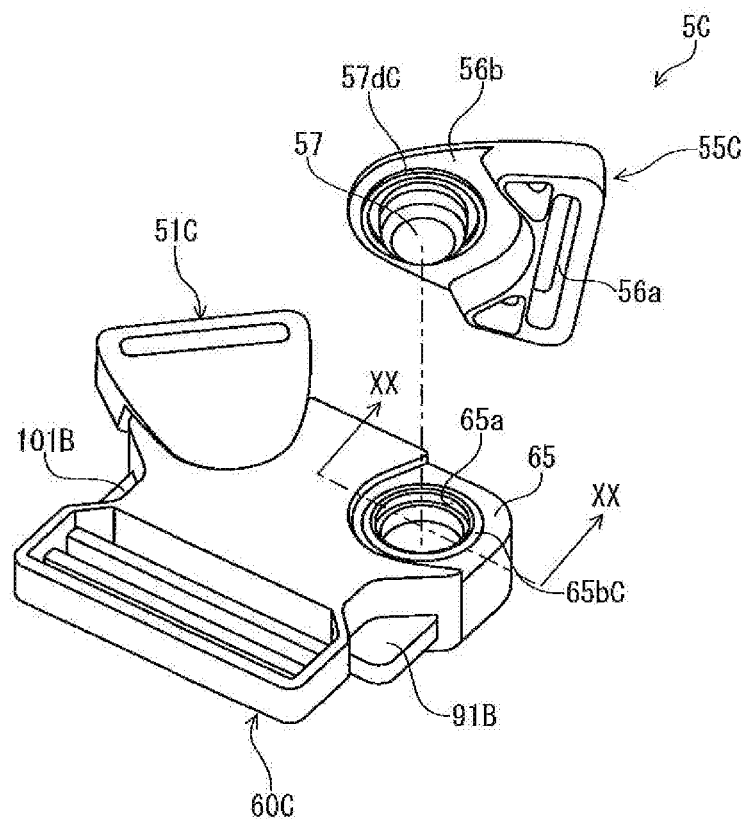
FIGS. 20A and 20B illustrate a movement restricting portion, where
Figure 20B:
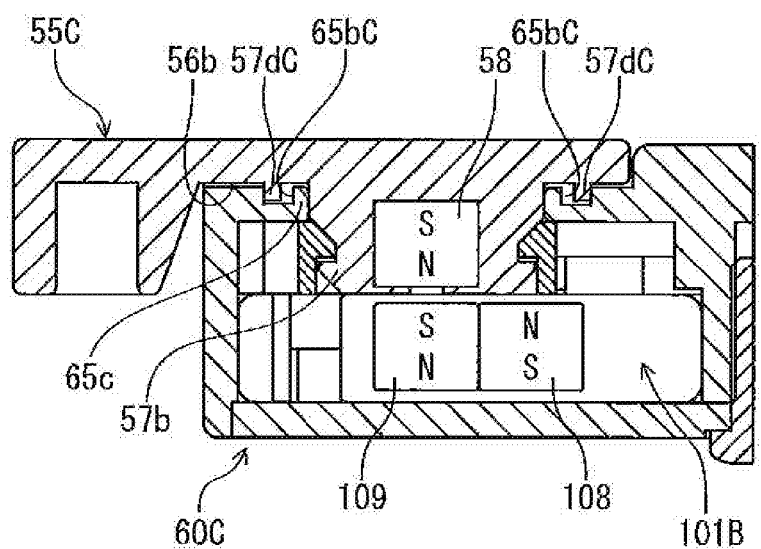

A modification of the movement restricting portion will be described with reference to FIGS. 20A and 20B. Engaging members 51C, 55C and an engaged member 60C may have the movement restricting portion.

The engaging member 55C has a rib 57dC on its stepped portion 56b. The rib 57dC projects outward from the stepped portion 56b. The rib 57dC has a circular shape and surrounds the insertion portion 57. Although the rib 57dC formed several millimeters away from the outer periphery of the insertion portion 57, the rib 57dC may be formed at any position within the region of the stepped portion 56b.

The engaged member 60C has a groove 65bC in its right recess 65. The groove 65bC is recessed from the surface of the right recess 65. The width of the groove 65bC is larger than that of the rib 57dC. The groove 65bC is formed at a position that corresponds to the rib 57dC when the engaging member 55C is engaged with the engaged member 60C. The groove 65bC has a circular shape and surrounds the through hole 65a. The rib 57dC and the groove 65bC serve as the movement restricting portion. The movement restricting portion of the present embodiment is in the form of a projection and a recess. The movement restricting portion (the rib 57dC and the groove 65bC) restricts the engaging member 55C from moving obliquely upward when the engaging member 55C is disengaged from the engaged member 60C. The projecting portion 53b of the engaging member 55C therefore will not be caught by the wall 64c. Although not shown in the figures, the left engaging member 51C has a shape similar to that of the right engaging member 55C, and the left recess 64 (FIG. 14) has a shape similar to that of the right recess 65.

Figure 21A:
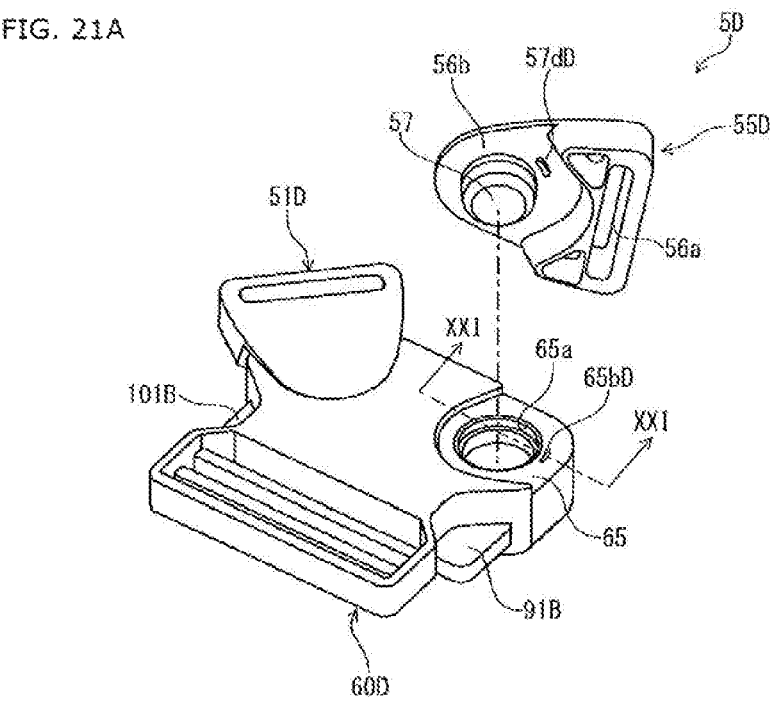
FIGS. 21A and 21B illustrate another modification of the movement restricting portion, where
Figure 21B:
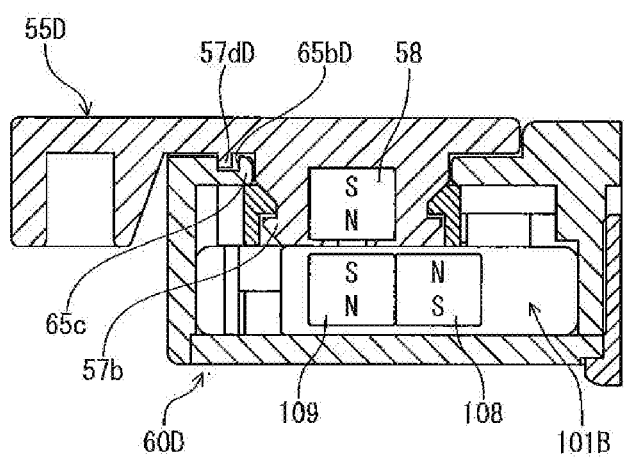

The movement restricting portion need not necessarily have a circular shape and need only be formed in a part of the engaging member and a part of the engaged member as shown in FIGS. 21A and 21B. In this case, a rib 57dD and a groove 65bD are formed at a position in the direction in which an engaging member 55D is ejected (the direction shown by the arrow in FIG. 18A). The longitudinal dimension of the groove 65bD may be either larger than or substantially the same as the width dimension of the rib 57dC. A left engaging member 51D has a shape similar to that of the right engaging member 55D, and the left recess 64 (FIG. 14) has a shape similar to that of the right recess 65.

Although the movement restricting portion is formed by the rib 57dC, 57dD of the engaging member 51C, 51D, 55C, 55D and the groove 65bC, 65bD of the engaged member 60C, 60D, the movement restricting portion may be opposite in shape to that described above. Namely, the engaging members 51C, 51D, 55C, 55D may have a groove, and the engaged member 60C, 60D may have a rib.

Figure 22A:
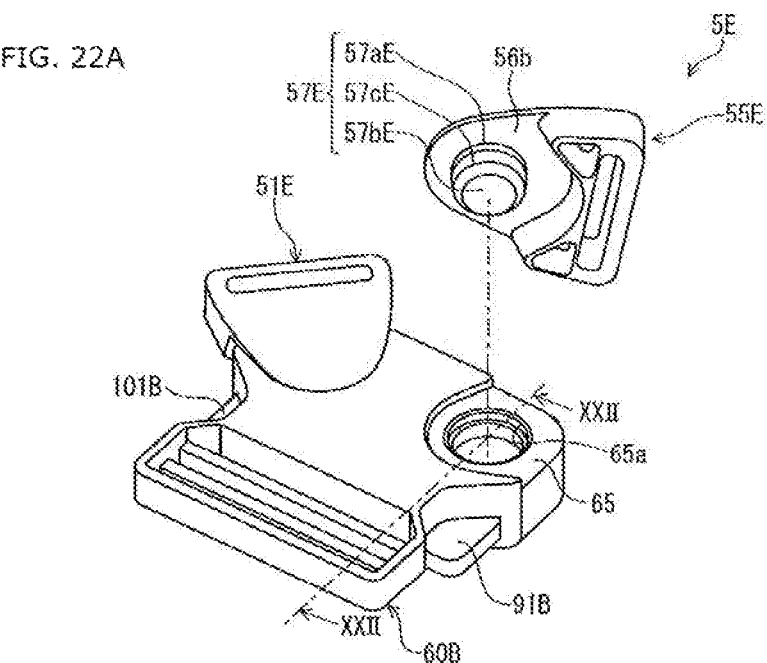
FIGS. 22A to 22C illustrate a further modification of the movement restricting portion, where
Figure 22B:
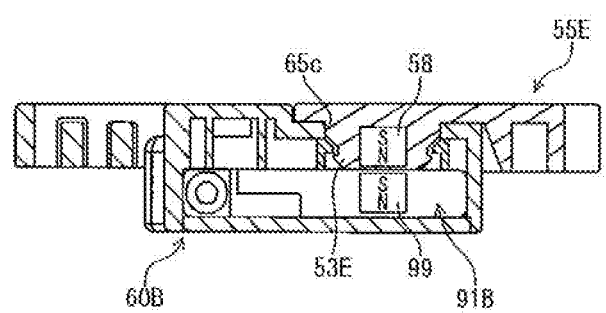
Figure 22C:
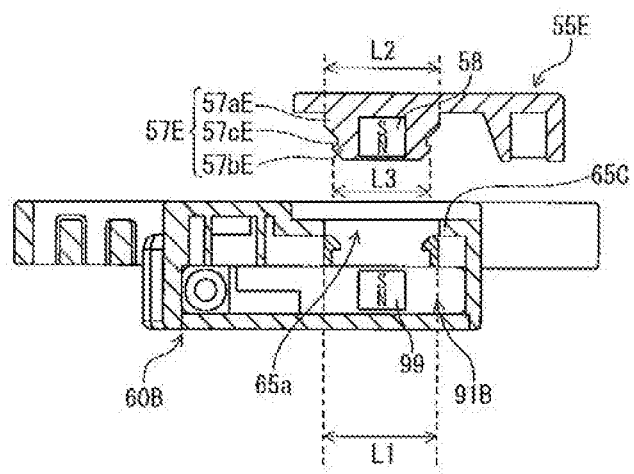
Figure 23:
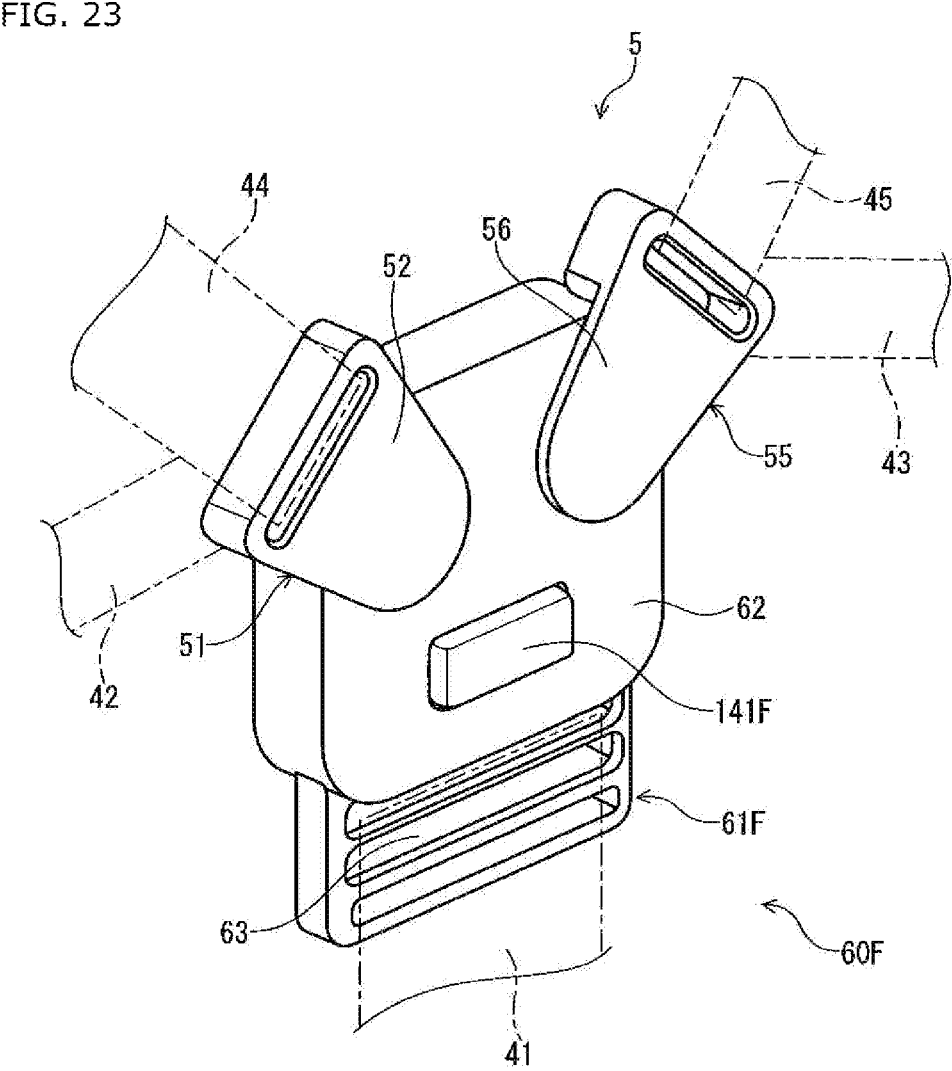
FIG. 23 is a perspective view of a buckle of a fourth embodiment.

A further modification of the movement restricting portion will be described with reference to FIGS. 22A to 22C. The movement restricting portion may be formed by modifying the shape of the insertion portion of the engaging member like insertion portions 53E, 57E (the insertion portion 53E is not shown) of engaging members 51E, 55E.

The insertion portion 57E of the engaging member 55E includes a first projecting portion 57aE, a groove 57cE, and a second projecting portion 57bE. The first projecting portion 57aE projects from the stepped portion 56b. The groove 57cE is continuous with the first projecting portion 57aE and is recessed inward with respect to the first projecting portion 57aE. The second projecting portion 57bE is continuous with the groove 57cE. As shown especially in FIG. 22C, the lateral dimension L2 of the first projecting portion 57aE is larger than the lateral dimension L3 of the second projecting portion 57bE. That is, the diameter L1 of the through hole 65a is slightly larger than the lateral dimension L2 of the first projecting portion 57aE and is much larger than the lateral dimension L3 of the second projecting portion 57bE.

With this configuration, even if the right engaging member 55E is tilted when disengaging the engaging member 55E from the engaged member 60E, the second projecting portion 57bE is less likely to be caught by the wall 65c of the through hole 65a. Accordingly, even if the engaging member 55E is ejected in the direction shown by arrow P3 (the direction extending obliquely upward toward the outside), the second projecting portion 57bE of the engaging member 55E is less likely to be caught by the wall 65c of the through hole 65a. The engaging member 55E can thus be smoothly ejected and disengaged. The left engaging member 51E has a shape similar to that of the right engaging member 55E.

Fourth Embodiment

A configuration example of a buckle 5F used in the stroller 1 according to a fourth embodiment will be described in detail with reference to FIGS. 23A to 27B. The configuration of the stroller 1 is similar to that of the first embodiment except for the configuration of the buckle 5F. Only the differences from the buckle 5 of the first embodiment will be described in detail.

The major difference between the buckle 5 of the first embodiment and the buckle 5F of the present embodiment is the shape of an engaged member 60F. That is, in the engaged member 60 of the first embodiment, the operation portions 91, 101 themselves are pressed to slide and displace the magnets 98, 99, 108, 109. In the engaged member 60F of the present embodiment, however, an operation button 141F is operated to rotate and move first and second operating portions 150F, 160F and displace the magnets 98, 99, 108, 109.

Engaged Member

Figure 24:
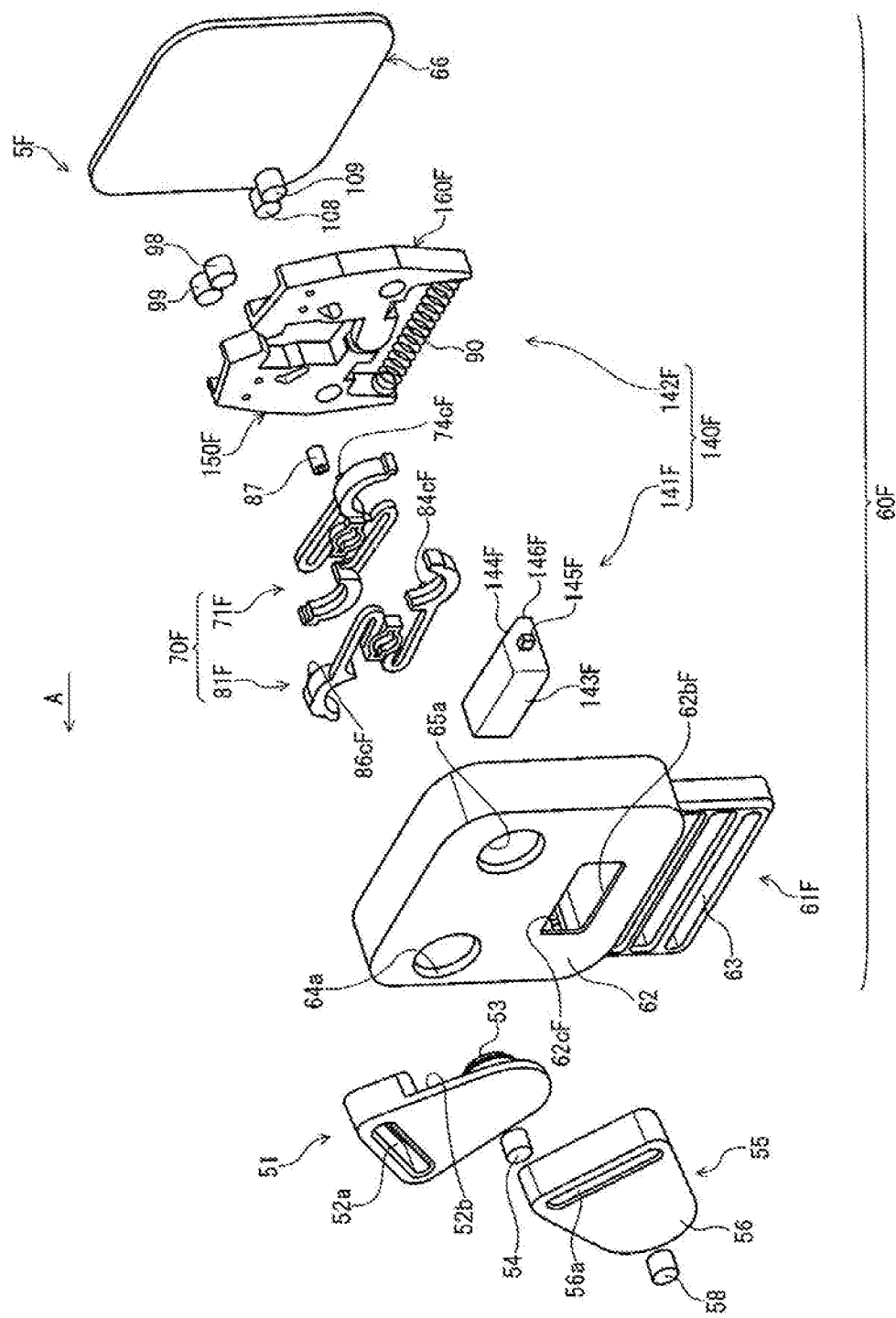
FIG. 24 is an exploded perspective view of the buckle of the fourth embodiment.
Figure 25A:
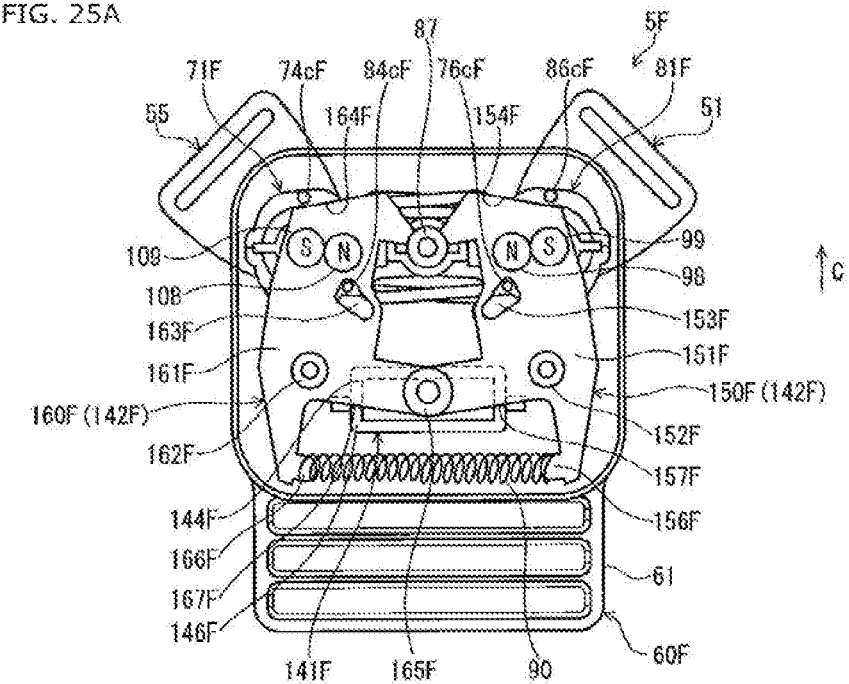
FIGS. 25A and 25B are rear views of an engaged member with a cover removed, illustrating how an operation portion operates, where
Figure 25B:
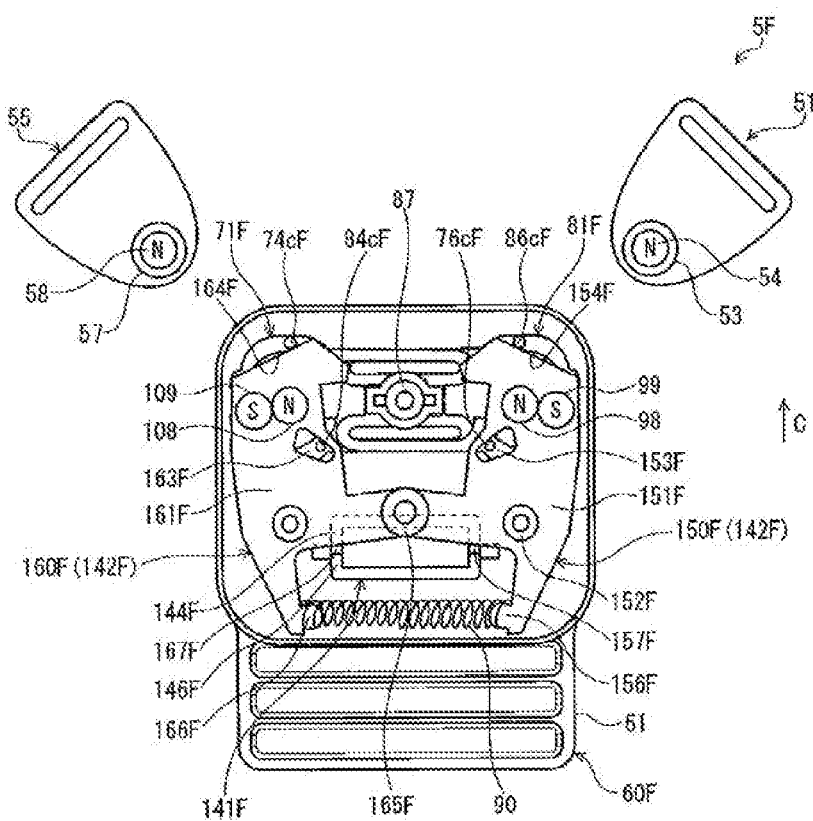

The engaged member 60F of the present embodiment will be described with reference to FIGS. 24, 25A, and 25B. The engaged member 60F includes a fixed portion 61F, an operation portion 140F, and a lock portion 70F. In FIG. 24, the direction shown by arrow A is the front side (front), and the direction opposite to the direction shown by arrow A is the back side (rear). In FIGS. 25A and 25B, the direction shown by arrow C is upward, and the direction opposite to the direction shown by arrow C is downward.

As shown especially in FIG. 24, the fixed portion 61F does not have the left recess 64 and the right recess 65 as in the first embodiment but has the through holes 64a, 65a in the housing 62. The housing 62 has an opening 62bF substantially in the center. The opening 62bF is an opening for the operation button 141f described later.

The operation portion 140F includes the operation button 141F and an operating portion 142F. The operating portion 142F is displaced when the operation button 141F is operated. The operation portion 140F includes a single operation button 141F, and the operation button 141F can be moved in the front-rear direction. The operation button 141F is a portion that is directly touched and moved with a finger. The operation button 141F includes not only a portion that is moved when pressed but also a portion that is pulled or pinched.

As shown in FIG. 24, the operation button 141F includes a pressing portion 143F, a tilted portion 144F, a vertical portion 146F, and latch portions 145F. The pressing portion 143F is formed on the front side of the operation button 141F. The tilted portion 144F is formed on the back side of the operation button 141F. The vertical portion 146F is parallel to the pressing portion 143F. The latch portions 145F secures the operation button 141F in the fixed portion 61F. The pressing portion 143F is a flat surface. The operation button 141F itself slides backward when the pressing portion 143F is pressed. The tilted portion 144F is tilted downward such that the front end of the tilted portion 144F is located higher than the rear end thereof. The tilted portion 144F is in contact with the operating portion 142F described later. Accordingly, the operating portion 142F can be displaced by operating the operation button 141F. This operation will be described later. The latch portions 145F are in the shape of a projection projecting outward from both sides of the operation button 141F. Slit-like latched portions 62cF are formed in the housing 62, and the latch portions 145F are caught and held by the latched portions 62cF such that the latch portions 145F can move in the front-rear direction in the latch portions 62cF.

The operating portion 142F includes a first operating portion 150F and a second operating portion 160F. The first operation porting 150F faces the through hole 64a of the fixed portion 61F, and the second operating portion 160F faces the through hole 65a of the fixed portion 61F. The first operating portion 150F and the second operating portion 160F are disposed vertically symmetrically. As shown in FIGS. 25A and 25B, the first operating portion 150F and the second operating portion 160F are connected by a rotation shaft 165F. The first operating portion 150F and the second operating portion 160F can be displaced by operating the operation button 141F.

Referring especially to FIGS. 25A and 25B, the first operating portion 150F includes a first operation body 151F, the second magnet 99, and the third magnet 98. The first operation body 151F has an upper edge 154F, a recess 153F, a shaft 152F, and a spring support portion 156F. A projection 86cF of a second lock portion 81F is in contact with the upper edge 154F. A projection 76cF of a first lock portion 71F is located in the recess 153F. The shaft 152F holds the first operation body 151F in the fixed portion 61F such that the first operation body 151F can rotate therein. The upper edge 154F is a tilted surface tilted downward such that the inner end of the upper edge 154F is located higher than the outer end thereof.

When the first operation body 151F is rotated clockwise about the shaft 152F, the tilt angle of the upper edge 154F increases and the recess 153F is moved downward. Like the left operation portion 91B of the third embodiment, the second magnet 99 is disposed on the outer side of the third magnet 98. The second magnet 99 and the third magnet 98 are substantially obliquely aligned in view of the fact that the first operation body 151F is rotated about the shaft 152F. Although the first operation body 151F is herein described as being rotated clockwise as the engaged portion 60F is viewed from the back, the first operation body 151F is rotated counterclockwise when the engaged portion 60F is viewed from the front.

The second operating portion 160F has substantially the same shape as the first operating portion 150F. The second operating portion 160F includes a second operation body 161F, the second magnet 109, and the third magnet 108. The second operation body 161F has an upper edge 164F, a recess 163F, a shaft 162F, and a spring support portion 166F. A projection 74cF of the first lock portion 71F is in contact with the upper edge 164F. A projection 84cF of the second lock portion 81F is located in the recess 163F. The shaft 162F holds the second operation body 161F in the fixed portion 61F such that the second operation body 161F can rotate therein. The upper edge 164F is a tilted surface tilted downward such that the inner end of the upper edge 164F is located higher than the outer end thereof. As described above, the first operating portion 150F and the second operating portion 160F are rotatably connected by the rotation shaft 165F.

When the second operation body 161F is rotated counterclockwise about the shaft 162F, the tilt angle of the upper edge 164F increases and the recess 163F is moved downward. Like the left operation portion 101B of the third embodiment, the second magnet 109 is disposed on the outer side of the third magnet 108. The second magnet 109 and the third magnet 108 are substantially obliquely aligned in view of the fact that the second operation body 161F is rotated about the shaft 162F. Although the second operation body 161F is herein described as being rotated counterclockwise as the engaged portion 60F is viewed from the back, the second operation body 161F is rotated clockwise when the engaged portion 60F is viewed from the front.

The first lock portion 71F and the second lock portion 81F have substantially the same overall shape as the first lock portion 71 and the second lock portion 81 of the first embodiment except for the positions of the projections 74cF, 76cF, 84cF, 86cF. The projections 76cF, 84cF and the projections 74cF, 86cF are not located horizontally symmetrically. Specifically, the projections 76cF, 84cF are located closer to the middle in the lateral direction of the first and second lock portions 71F, 81F than the projections 74cF, 86cF are.

Operation of Buckle

Figure 26A:
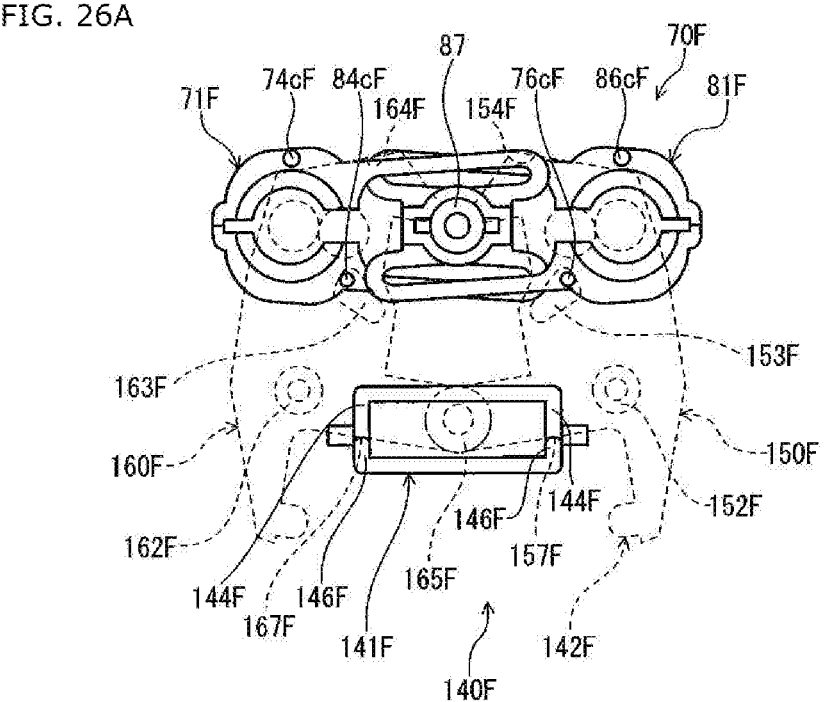
FIGS. 26A and 26B show the operation portion and a lock portion, where
Figure 26B:
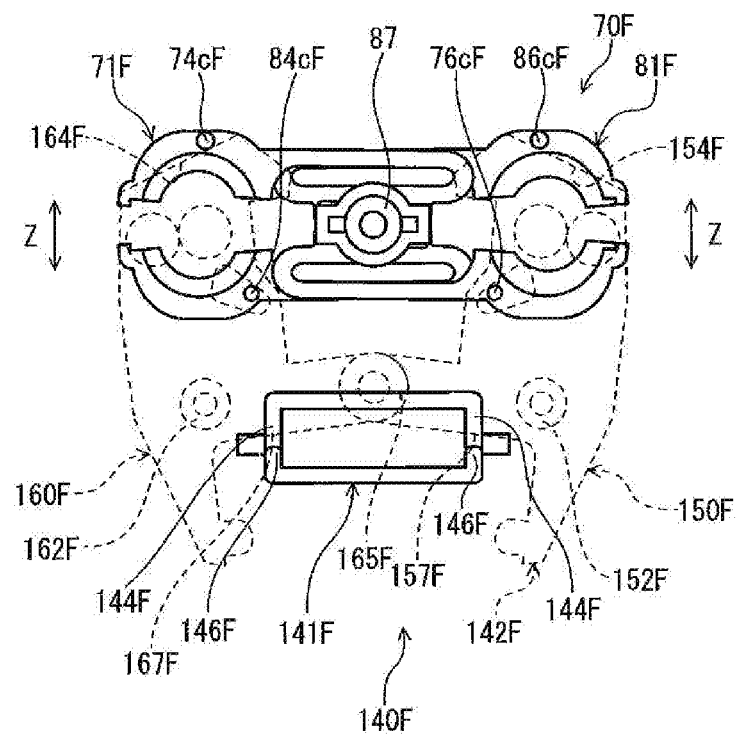

Next, how the engaging members 51, 55 and the engaged member 60F of the buckle 5F operate will be described with reference to FIGS. 25A to 27B. FIGS. 26A and 26B show the lock portion 70F, the operation button 141F, and the operating portion 142F. Since FIGS. 26A and 26B illustrate the lock portion 70F and the operation button 141F as viewed from the back, the operating portion 142F is shown by dashed lines. FIG. 26A shows the lock portion 70F, the operation button 141F, and the operating portion 142F with the operation portion 140F not being operated, and FIG. 26B shows the lock portion 70F, the operation button 141F, and the operating portion 142F with the operation portion 140F being operated.

Figure 27A:
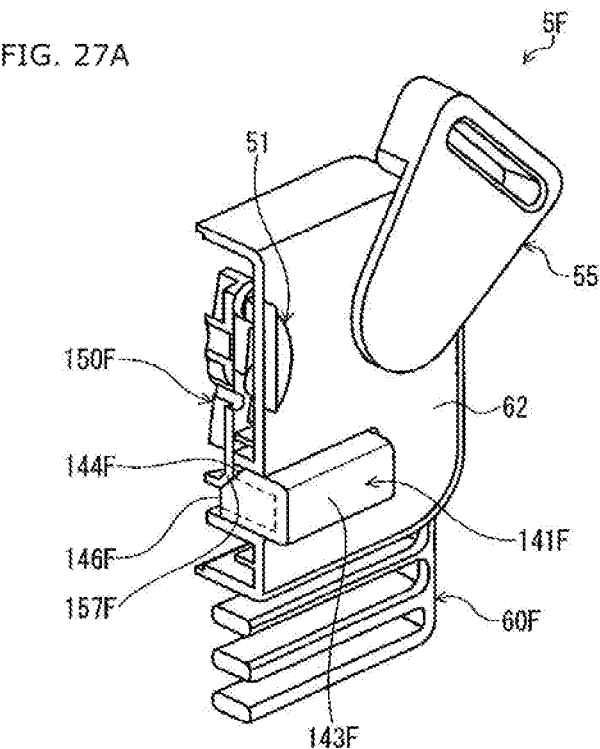
Figure 27B:
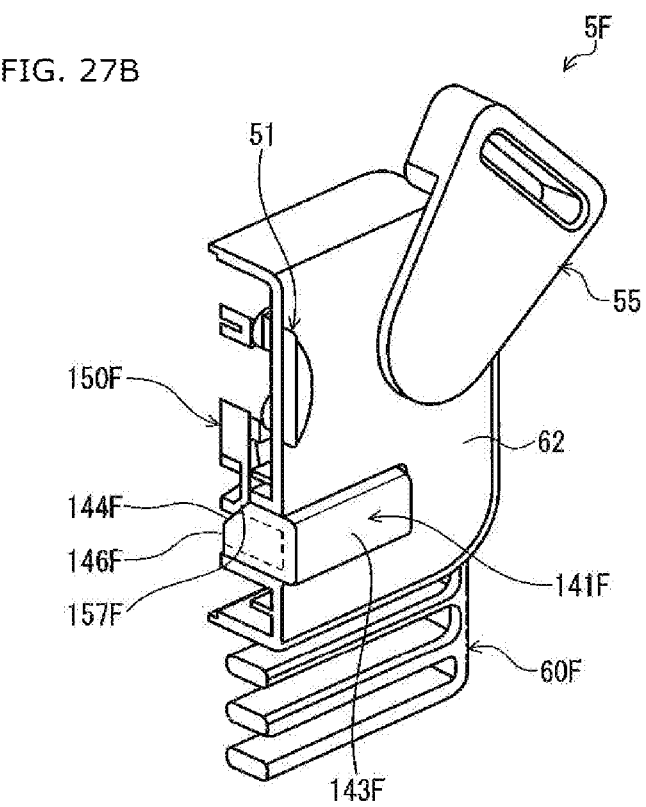
FIG. 27B shows the operation portions and the lock portion with the operation portion being operated.

First, as shown in FIGS. 27A and 27B, the pressing portion 143F of the operation button 141F is pressed rearward. Referring also to FIGS. 26A and 26B, the tilted portion 144F of the operation button 141F is in contact with lower ends 157F, 167F of the first and second operating portions 150F, 160F. Accordingly, when the operation button 141F is pressed rearward, the lower ends 157F, 167F of the first and second operating portions 150F, 160F are moved upward along the tilted portion 144F of the operation button 141F.

As shown in FIG. 26B, when the operation button 141F is pressed and the lower ends 157F, 167F of the first and second operating portions 150F, 160F are moved upward accordingly, the first operating portion 150F is rotated clockwise about the shaft 152F, and the second operating portion 160F is rotated counterclockwise about the shaft 162F. Since the first and second operating portions 150F, 160F are connected by the rotation shaft 165F, the first and second operating portions 150F, 160F are rotated together. As the first and second operating portions 150F, 160F are rotated, the projections 74cF, 86cF of the first and second lock portions 71F, 81F move along the tilted upper edges 154F, 164F, and the projections 76cF, 84cF of the first and second lock portions 71F, 81F move within the recesses 153F, 163F. The first and second lock portions 71F, 81F thus open in the direction shown by arrow Z. Moreover, since the first and second operating portions 150F, 160F are rotated, the N poles of the third magnets 98, 108 and the N poles of the first magnets 54, 58 face each other and repel. The engaging members 51, 55 are thus disengaged from the engaged member 60F.

As described above, the engaging members 51, 55 can be disengaged from the engaged member 61F by merely operating the operation button 141F. Since the unlock operation can thus be performed with one finger, this configuration simplifies the unlock operation. Since the operation button 141F is a separate member from the first and second operating portions 150F, 160F in which the second magnets 99, 109 are mounted, the operation direction can be made different from the direction in which the magnets are moved.

In the first and second embodiments, the stroller is described as an example of the child care equipment with a seat. However, the present disclosure is not limited to this and may be applicable to any child care equipment with a seat which is used for children, such as a highchair, a child care chair, and a child safety seat.

In the first and second embodiments, the waist straps 42, 43 and the shoulder straps 44, 45 are connected to the engaging members 51, 55. However, the shoulder straps 44, 45 need not necessarily be connected to the engaging members 51, 55, and at least the waist straps 42, 43 need only be attached to the engaging members 51, 55.

In the first and second embodiments, the third magnets 98, 98A, 108, 108A are mounted in the engaged members 60, 60A. However, the second magnets 99, 99A, 109, 109A need only be mounted in the engaged members 60, 60A.

The movement restricting portion may be provided only in the engaged members 60B, 60C, 60D. The movement restricting portion is not limited to the shape described above as long as it restricts the insertion portions 53B, 57B of the engaging members 51B, 55B from moving outward in the operation direction within the through holes 64a, 65a while the insertion portions 53B, 57B are located in the through holes 64a, 65a.

The direction in which the operation button 141F is moved and the direction in which the operating portion 142F is moved are not limited. Specifically, the operation button 141F may be moved obliquely upward, and the operating portion 142F may be moved in the up-down direction by operating the operation button 141F. The operating portion 142F need only be composed of at least one operation portion. In this case, it is preferable that the four magnets, namely the second magnets 99, 109 and the third magnets 98, 108, be alternately arranged and aligned in the up-down direction in the operating portion 142F.

The operation button 141F and the operating portion 142F are not directly connected to each other, and may be connected via other member.

The buckle 5A of the second embodiment is a 3-point harness including the left engaging member 51A connected to the waist strap 42 and the shoulder strap 44 and the right engaging member 55A is connected to the waist strap 43 and the shoulder strap 45. However, the buckle 5A may be a 5-point harness including a pair of engaging members connected to the waist straps 42, 43 and a pair of engaging members connected to the shoulder straps 44, 45. Specifically, the buckle 5A may include two left engaging members and two right engaging members, namely an upper left engaging member connected to the shoulder strap 44, a lower left engaging member connected to the waist strap 42, an upper right engaging member connected to the shoulder strap 45, and a lower right engaging member connected to the waist strap 43. In this case, it is preferable that two second magnets 99A and two third magnets 98A be alternately arranged in the up-down direction.

The buckles 5, 5B, and 5F of the first, third, and fourth embodiments are also a 3-point harness. However, the buckles 5, 5B, and 5F may be a 5-point harness including a pair of engaging members connected to the waist straps 42, 43 and a pair of engaging members connected to the shoulder straps 44, 45.

Although the embodiments of the present disclosure are described above with reference to the drawings, the present disclosure is not limited to the illustrated embodiments. Various modifications and variations can be made to the illustrated embodiments without departing from the spirit and scope of the disclosure or the claimed invention.

What is claimed is:

1. Child care equipment with a seat, comprising:
   a seat part forming an accommodating space configured to accommodate an infant;
   a crotch strap configured to extend between thighs of the infant seated in the seat part;
   a pair of waist straps that are configured to restrain a waist of the infant; and
   a buckle connecting the crotch strap and the pair of waist straps, wherein
   the buckle includes a pair of engaging members connected to the pair of waist straps, and an engaged member connected to the crotch strap,
   each of the pair of engaging members has a first magnet, and
   the engaged member has a second magnet that magnetically attracts the first magnet.

2. The child care equipment with the seat according to claim 1, wherein
   each of the pair of engaging members includes an insertion portion having the first magnet of each respective one of the pair of engaging members,
   the engaged member includes a fixed portion connected to the crotch strap and an operation portion supported by the fixed portion such that the operation portion is displaced with respect to the fixed portion,
   the fixed portion has a pair of through holes into which the insertion portions of each of the pair of engaging members is inserted, and
   the operation portion has the second magnet that is displaced between a first position, facing the pair of through holes, and a second position, not facing the pair of through holes, by operation of the operation portion in an operation direction.

3. The child care equipment with the seat according to claim 2, wherein
   the operation portion further has a third magnet that is opposite in polarity from the second magnet, and the third magnet of the engaged member is displaced to a third position, facing the first magnets of each of the pair of engaging members inserted into the pair of through holes.

4. The child care equipment with the seat according to claim 3, wherein
the second magnet and the third magnet are aligned in the operation direction of the operation portion, and
the third magnet is located on an outer side of the operation portion in the operation direction with respect to the second magnet.

5. The child care equipment with the seat according to claim 3, wherein
the second magnet and the third magnet are aligned in the operation direction of the operation portion, and
the third magnet is located on an inner side of the operation portion with respect to the second magnet.

6. The child care equipment with the seat according to claim 5, wherein each of the pair of engaging members or the engaged member includes a movement restricting portion that restricts each of the insertion portions from moving outward in the operation direction within the respective through hole while each of the insertion portions is located in the respective through holes.

7. The child care equipment with the seat according to claim 2, wherein the operation portion includes a first operation portion facing a first one of the pair of through holes, and a second operation portion facing a second one of the pair of through holes.

8. The child care equipment with the seat according to claim 2, wherein the operation portion is disposed at a first operation portion position facing the pair of through holes.

9. The child care equipment with the seat according to claim 2, wherein the engaged member further includes a lock portion that engages in an elastically deformable manner with each of the insertion portions of each of the pair of engaging members inserted into the pair of through holes to keep the insertion portions engaged.

10. The child care equipment with the seat according to claim 9, wherein the lock portion releases each of the insertion portions by operation of the operation portion.

11. The child care equipment with the seat according to claim 1, wherein
each of the pair of engaging members includes an insertion portion having the first magnet,
the engaged member includes a fixed portion connected to the crotch strap and an operation portion supported by the fixed portion such that the operation portion is displaced with respect to the fixed portion,
the fixed portion has a pair of through holes into which each of the insertion portions of the pair of engaging members is inserted, and
the operation portion has an operation button and an operating portion that has the second magnet and that is displaced by operation of the operation button.

12. The child care equipment with the seat according to claim 11, wherein the operating portion rotates about a shaft with respect to the fixed portion.

13. The child care equipment with the seat according to claim 11, wherein
the operation button moves linearly with respect to the fixed portion, and
the operating portion converts a linear motion of the operation button to a rotary motion of the operating portion and is held in the fixed portion such that the operation portion rotates.

14. The child care equipment with the seat according to claim 11, wherein the second magnet is displaced between a first position facing the pair of through holes and a second position not facing the pair of through holes.

15. The child care equipment with the seat according to claim 11, wherein
the operating portion further has a third magnet that is opposite in polarity from the second magnet, and
the operation button is configured to displace the third magnet of the operating portion to a fifth position facing the first magnets of each of the engaging members that are inserted into each of the insertion portions of each of the engaging members.

16. The child care equipment with the seat according to claim 11, wherein the operating portion has a first operating portion facing a first one of the pair of through holes, and a second operating portion facing a second one of the pair of through holes and wherein operation of the operation button displaces the first operating portion and the second operating portion.

* * * * *

UNITED STATES PATENT AND TRADEMARK OFFICE
CERTIFICATE OF CORRECTION

| | | |
|---|---|---|
| PATENT NO. | : 11,317,736 B2 | |
| APPLICATION NO. | : 16/722542 | |
| DATED | : May 3, 2022 | |
| INVENTOR(S) | : Hitoshi Yabuuchi | |

It is certified that error appears in the above-identified patent and that said Letters Patent is hereby corrected as shown below:

On the Title Page

Item (71), In the applicant section, "Aprica Children's Products G.K." should be changed to -- Newell Brands Japan G.K. --.

Item (73), In the assignee section, "Aprica Children's Products G.K." should be changed to -- Newell Brands Japan G.K. --.

Signed and Sealed this
Twenty-third Day of August, 2022

Katherine Kelly Vidal
*Director of the United States Patent and Trademark Office*